United States Patent [19]
Dysarz

[11] Patent Number: 4,902,520
[45] Date of Patent: Feb. 20, 1990

[54] DEVICE AND METHOD TO POP CORN

[76] Inventor: Edward D. Dysarz, 11423 Triola La., Houston, Tex. 77072

[21] Appl. No.: 255,867

[22] Filed: Oct. 11, 1988

[51] Int. Cl.⁴ .............................................. B65D 81/34
[52] U.S. Cl. .................................... 426/107; 426/111; 426/113; 426/119
[58] Field of Search ............... 426/107, 111, 113, 234, 426/243, 119, 394, 412, 108, 132; 99/323.4, 323.5, 323.8, 323.9, 323.11

[56] References Cited

U.S. PATENT DOCUMENTS

| | | | |
|---|---|---|---|
| 2,480,679 | 8/1949 | Spencer | 426/234 |
| 2,586,347 | 2/1952 | Kloster | 99/323.9 |
| 2,741,559 | 4/1956 | Banowitz | 426/413 |
| 3,361,576 | 1/1968 | Jacobson | 426/107 |
| 4,435,628 | 3/1984 | Bowen et al. | 426/243 |
| 4,525,367 | 6/1985 | Allison | 426/124 |
| 4,596,713 | 6/1986 | Burdette | 426/113 |

Primary Examiner—Donald E. Czaja
Assistant Examiner—Drew S. Workman

[57] ABSTRACT

A device and method to pop corn while preventing any unpopped kernels from mixing with the popped corn and further preventing the already popped corn from burning. Each corn kernel is placed into an individual cell on a cassette. When the kernel is popped, it pops out of the cell and falls off of the cassette and is thus removed from the heat source. The unpopped kernels remain in the cassette where they will later be disposed of.

31 Claims, 20 Drawing Sheets

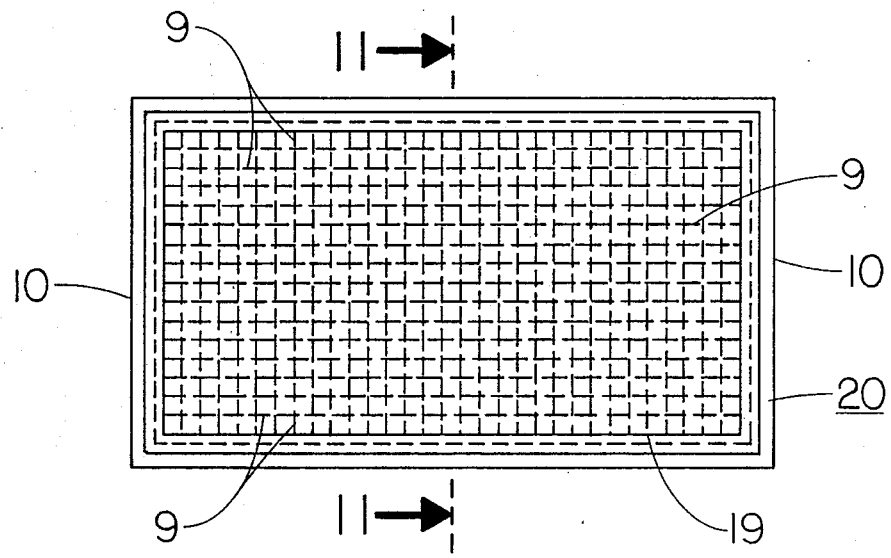
FIGURE 9
FIGURE 10
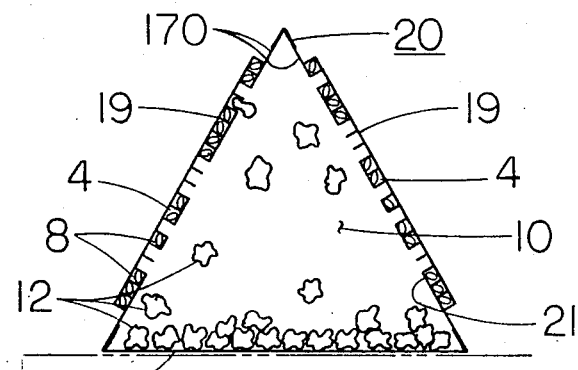
FIGURE 11
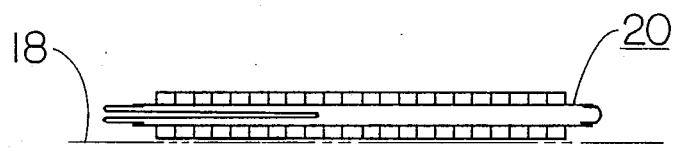
FIGURE 12

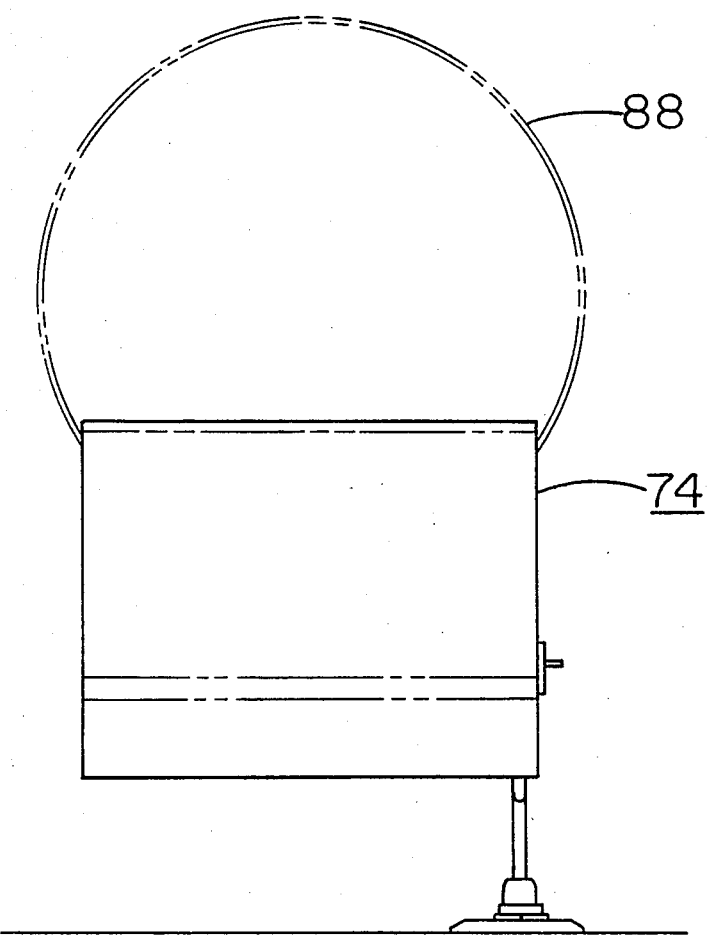
FIGURE 38
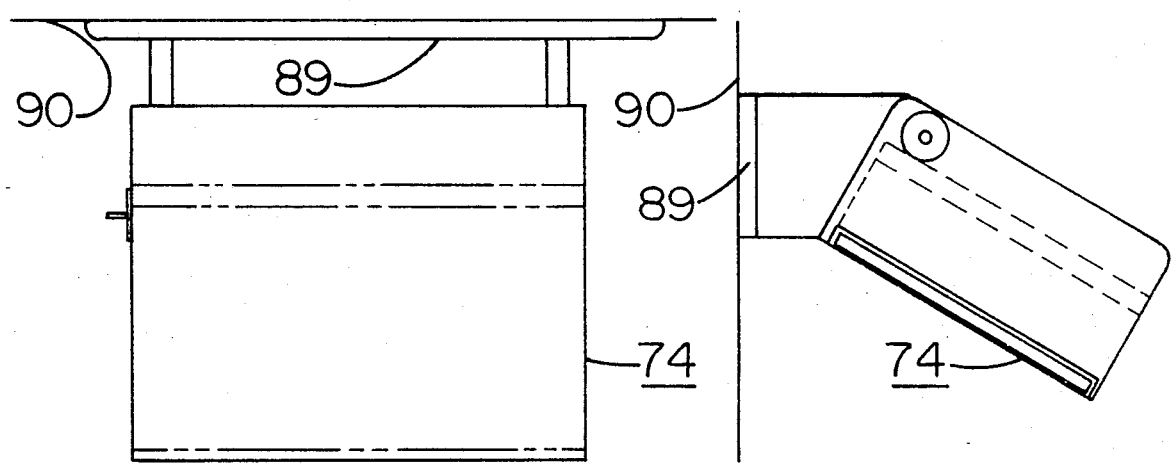
FIGURE 39
FIGURE 40

DEVICE AND METHOD TO POP CORN

FIELD OF THE INVENTION

The present invention relates to popping corn. The present invention has been found to be particularly useful in popping corn while preventing the unpopped kernels from mixing with the popped kernels. The present invention has also been found to be particularly useful in popping corn while preventing the already popped corn from burning.

DESCRIPTION OF THE PRIOR ART

Popped corn is generally eaten as a snack food. Most households have a device that will pop corn. Popped corn is eaten and enjoyed as a snack food in most countries of the world.

There exists various methods of popping corn today. One of the earliest methods of popping corn is placing the corn kernels into a pot or pan with some oil, placing the pot or pan over a source of heat, heating the oil to a proper temperature that causes the corn kernels to pop. The problem with this method of popping corn is that the popped corn lays in the bottom of the pot or pan and burns or scorches and also absorbs the oil on the bottom of the pot or pan. Another earlier method of popping corn is to place the corn kernels into a container made of wire mesh and to hold the corn over an open fire. The heat will pop the corn, but it also easily burns the popped corn.

Still another method of popping corn is the air method. With this method, hot air is blown onto the unpopped kernels, causing the kernels to pop. When the kernels pop, the hot air blows the popped corn into a chute where it falls into a bowl or other container.

There are several problems with this method of popping corn. (1) It cannot be used in a microwave oven. (2) The unpopped kernels (those kernels that will not pop) tend to clog up the chute and air vent of the air popper. (3) Cooking oil is not used to pop the corn; even though butter may be added, the corn still has a flat taste. (4) The air popper takes a long time to pop the corn and it requires more energy to pop the corn.

Another method of popping corn is the use of a microwave oven. The corn kernels with cooking oil and perhaps flavoring are placed in a non-metallic bag that expands as the corn is popped. There are various methods of adding a charge to expand the bag as the corn is being popped, but in most cases a charge of steam from the popped corn will expand the bag.

Several types of expanding bags for popping corn have been known and used before and typical examples thereof are shown in U.S. Pat. Nos. 2,865,768 issued to BARNES; 2,741,559 issued to BANOWITZ; 2,673,806 issued to COLMAN; 3,052,554 issued to COLMAN; 3,835,280 issued to GADES; 3,973,045 issued to BRANDBERG; 4,036,423 issued to GORDON; 4,038,425 issued to BRANDBERG; 4,292,332 issued to MCHAM; 4,548,826 issued to WATKINS.

Although all of the devices will pop corn, and the devices from Gades and Watkins are for popping corn in a microwave oven, they all have several problems. The first problem is that the unpopped kernels will mix with the popped corn and will require care while eating to prevent biting down on an unpopped kernel. The second problem is that when there is about twenty-five percent of unpopped corn, there remains an excess of salt and other flavoring which makes the popped corn oily or salty. The third problem is that while attempting to pop the unpopped kernels, the popped kernels which are rather delicate, get burned easily.

When using a microwave oven, the problem of burning the corn is more acute. With a microwave oven, the microwaves or energy waves come from the top of the oven and therefore must heat the corn kernels from above. When more then half of the corn kernels are popped, they cover up the unpopped kernels and therefore the microwave energy must go through the popped corn first and, therefore, will be absorbed in the popped corn before it reaches the unpopped kernels. This causes the popped corn to absorb most of the energy and scorch while the unpopped kernels do not get sufficient energy to be popped.

SUMMARY OF THE INVENTION

The present invention is a highly efficient device that will pop corn while preventing unpopped kernels from mixing with the popped corn. The present invention will prevent or resist the popped corn from burning and scorching while directing more heat or microwave energy into the unpopped corn kernels.

The method of popping corn of the preferred embodiment is for popping corn in a microwave oven wherein the unpopped corn kernels are held in place at the top of the container and are exposed to the more intense microwaves and further reduce the effect of the microwaves on the already popped corn by absorbing the microwaves or energy before it can go into the already popped corn, thus preventing the already popped corn from burning and further causing the unpopped corn to absorb more energy and pop sooner.

Other embodiments of the present invention will allow the present invention to be used for popping corn with a conventional heating method while still preventing the unpopped kernels from mixing with the popped corn and from further burning or scorching the popped corn.

BRIEF DESCRIPTION OF THE DRAWINGS

For further understanding of the nature and objects of the present invention, reference should be had to the following detailed description of the preferred embodiment and other embodiments thereof taken in conjunction with the accompanying drawings, in which parts are given like numerals and wherein:

FIG. 9 is an elevation of the device of FIG. 7 showing it in a compressed condition before energy is applied.

FIG. 10 is still another configuration of the device of the preferred embodiment.

FIG. 11 is a section elevation as taken through FIG. 10.

FIG. 12 is a section elevation of the device of FIGS. 10 and 11 showing the device in a folded package condition.

FIG. 38 is a plan view of the free standing popcorn popper.

FIG. 39 is a plan view of a wall mounted popcorn popper.

FIG. 40 is an elevation of a wall mounted popcorn popper.

FIG. 51b is a section elevation as taken through FIG. 51a.

FIG. 52 is an elevation of a roller popcorn system.

FIG. 53 is a plan view of a roller popcorn system.

FIG. 54 is an elevation of the roller popcorn system.

FIG. 55 is an elevation view of the stand of the roller popcorn system.

FIG. 56 is a section elevation of the roller popcorn system as taken through FIG. 53.

FIG. 57 is a section plan view of the roller popcorn system as taken through FIG. 57.

FIG. 58 is a section elevation of the sheet of the roller popcorn system as taken through FIG. 57.

FIG. 59 is a preassembly view of the setting of the roller module onto the stand.

FIG. 60 is an elevation view of the placing of the roller module onto the stand.

FIG. 61 is an elevation view of the roller module on the stand.

FIG. 62 is an elevation of a popcorn cassette filler.

FIG. 63 is a section elevation of a popcorn cassette filler as taken through FIG. 62.

FIG. 64 is a section plan view as taken through FIG. 62.

FIG. 65 is a section elevation as taken through FIG. 62.

FIG. 66 is a plan view of the popcorn popper cassette.

FIG. 67 is a section elevation as taken through FIG. 63.

DETAILED DESCRIPTION OR THE PREFERRED EMBODIMENTS

The embodiments of the device and the method of the present invention may be used to pop corn while preventing the already popped corn from burning or scorching.

The superior ability to pop corn is accomplished by placing each corn kernel into its own popping chamber and popping each corn kernel as a single unit.

Another object of the invention is to prevent the unpopped corn kernels from mixing with the already popped corn kernel.

Still another object of the invention is to place the unpopped kernels closer to the source of heat or energy, thus reducing the energy required to pop corn.

Yet another object of the invention is to pop a greater number of kernels by placing said kernels closer to the heat source.

Yet another object of the invention is to pop corn in a microwave oven into a bowl.

Yet another object of the invention is to pop corn in a microwave oven without an excess of oil, salt or flavoring in the popped corn.

Yet another object of the invention is to keep a precise ratio of oil, salt and flavoring in the popped corn.

DEVICE AND ITS METHOD OF USE

Figure 1:
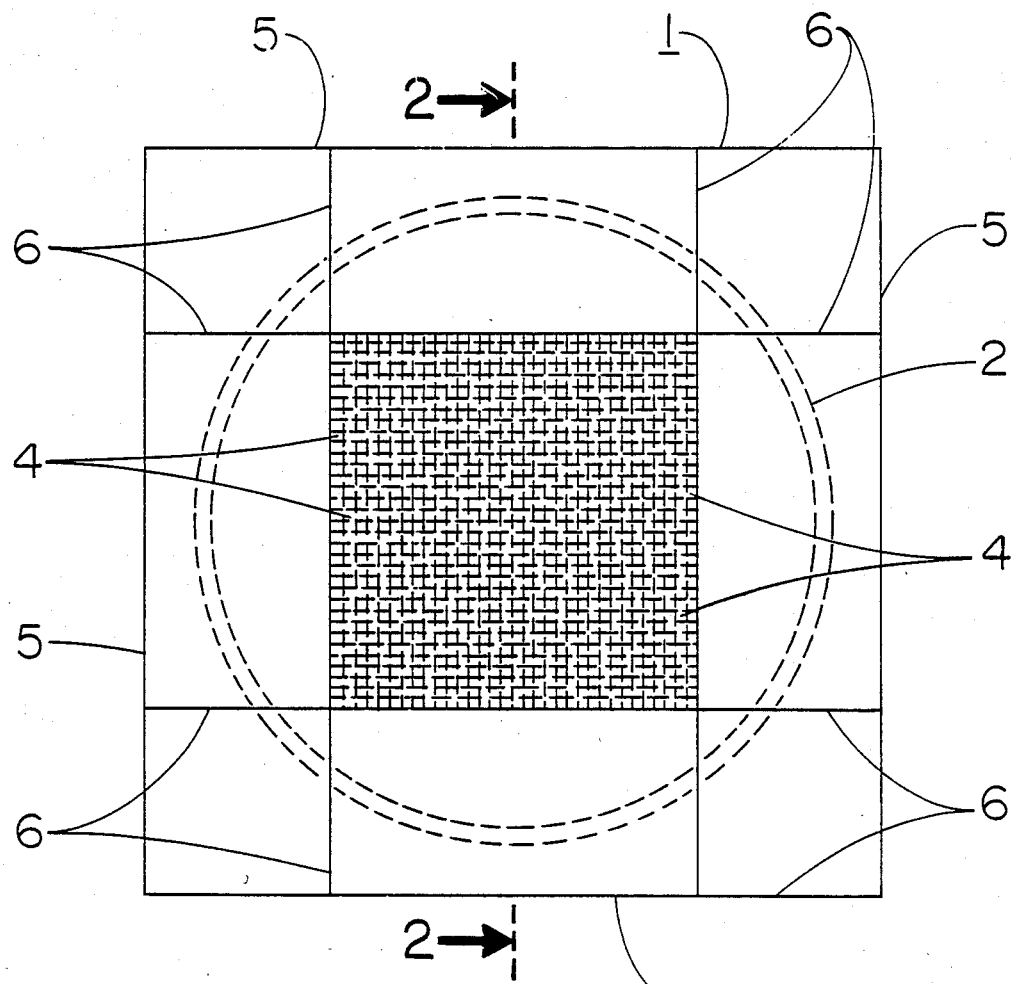
FIG. 1 is a plan view of the preferred embodiment showing the device on a bowl.

Referring to FIG. 1, there is shown a plan view of a popcorn sheet 1 setting on the top of a bowl 2 or suitable container. A popcorn panel 3 is suitably fixed to the underside of the popcorn sheet 1. The popcorn panel 3 is comprised of the popcorn kernel chambers 4. The popcorn panel 3 is supported over the bowl 2 by the support panels 5 that rest on the upper lip of the bowl 2 or suitable container and are part of the popcorn sheet 1.

The support panels 5 are shown with fold lines 6, which is where the support panels 5 are folded when the popcorn sheet 1 is in a package on a store shelf. The popcorn sheet 1 is set on top of a bowl 2 and placed into a microwave oven where it is exposed to the microwaves.

Figure 2:
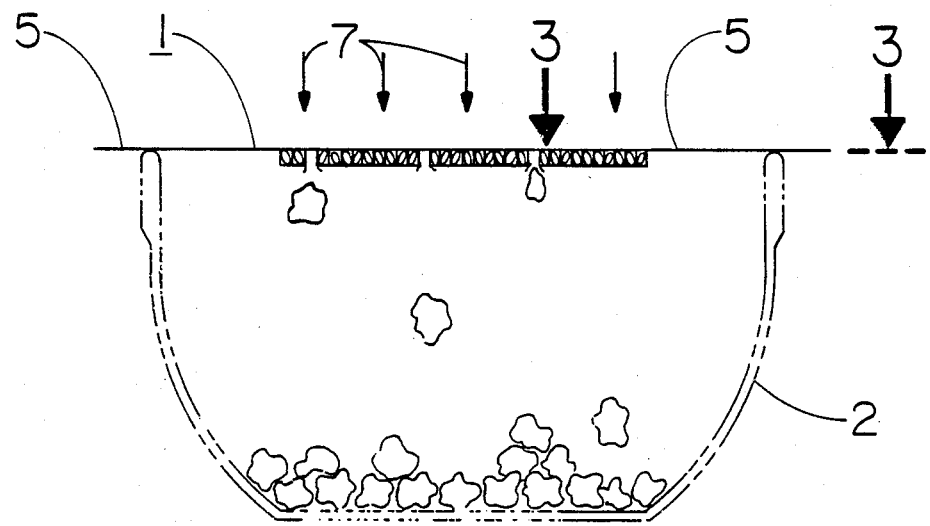
FIG. 2 is a section elevation of the preferred embodiment taken through FIG. 1 showing the device in use.

Referring to FIG. 2, there is shown a section elevation as taken through FIG. 1. The popcorn sheet 1 is supported on the bowl 2 by the support panels 5.

The unpopped corn kernels 8 are held in the popcorn kernel chambers 4 and by the chamber walls 9, the cover panel 10 and the burst panel 11. The popcorn panel 3 is part of the cover sheet 1.

The microwaves 7 penetrate the popcorn panel 3 and heat up the corn kernels 8. When the corn kernels 8 are sufficiently heated, they pop into popped corn 12. When the corn kernels 8 pop, they burst through the burst panel 11 and fall into the bowl 2.

The support panel 5 will also defuse the microwaves 7 to some extent, and thus will prevent the microwaves from burning the popped corn 12. The distance from the source of the microwaves 7 and the popped corn 12 is greater than the distance from the source of the microwaves 7 and the corn kernels 8 and therefore the ability of the microwaves 7 to burn the popped corn 12 is substantially lessened.

Figure 3:
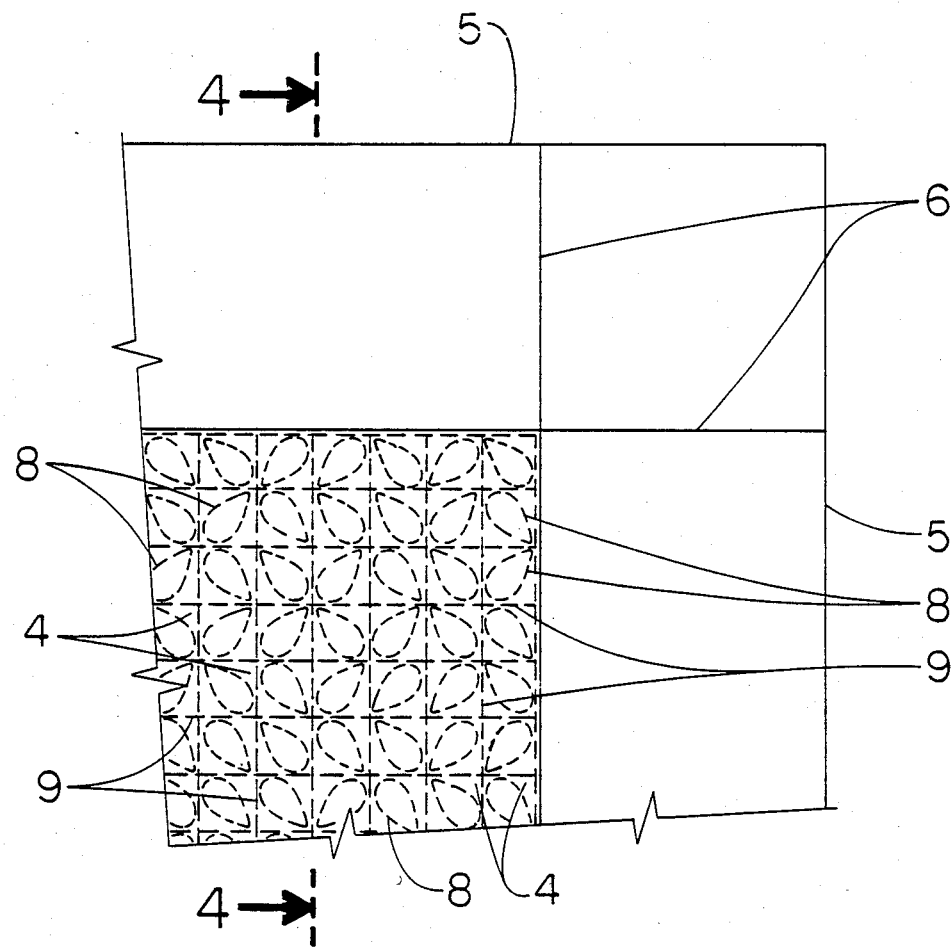
FIG. 3 is an enlarged view taken from FIG. 2.

Referring to FIG. 3, there is shown an enlarged view taken from FIG. 2.

The corn kernels 8 are shown held in place by the chamber walls 9 that make up the popcorn kernel chambers 4 and covered by the popcorn panel 3. The support panels 5 are shown along with the fold lines 6.

Figure 4:
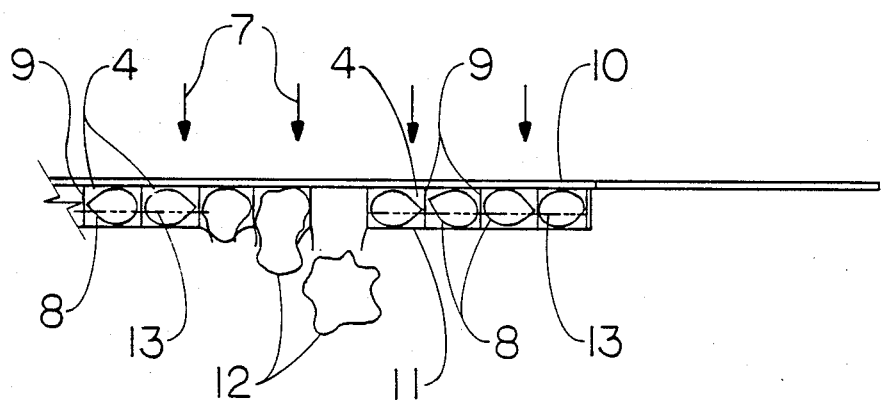
FIG. 4 is an enlarged section elevation taken through FIG. 3 showing the corn kernels popping.

Referring to FIG. 4, there is shown an enlarged section elevation as taken through FIG. 3 further defining how the corn kernels 8 are held in place and popped.

The corn kernels 8 are shown held in place in the popcorn kernel chamber 4 that is composed of the popcorn panel 3, the burst panel 11 and the chamber walls 9. As the microwaves 7 penetrate the popcorn panel 3, and heat the corn kernels 8, the steam builds up within the corn kernels 8 which causes them to explode or pop open, when this occurs the popped corn 12 will burst through the burst panel 11, tearing the burst panel 11 as it bursts through the burst panel 11. The popped corn 12 will fall into the bowl not shown or some other suitable container not shown.

There is also shown a suitable amount of suitable oil 13, salt or flavoring within the popcorn kernel chamber 4. When the corn kernels 8 pop into popped corn 12 only that amount of oil 13, salt and flavoring is released that is contained in the popcorn kernel chamber 4 and no more or no less; this will assure a constant amount of oil, salt and flavoring per unit of popped corn. This will also assure that there will not be any excess salt, oil 13 or flavoring at the bottom of the bowl. Where a corn kernel 8 does not pop, that salt, oil or flavoring will not be released into the bowl, thereby assuring that the popped corn 12 will not be too salty, too oily or over flavored.

The burst panel 11 is made of suitable paper or plastic or other suitable material that will not leak under heated conditions and yet it will be sufficiently brittle to allow the popped corn 12 to break through and fall out. The popcorn panel 3 and the chamber walls 9 are sufficiently strong not to break down when the corn is popped. The burst panel 11 must also be of a suitable material that will prevent the oil 12 from bleeding through or penetrating the burst panel 11.

Figure 5:
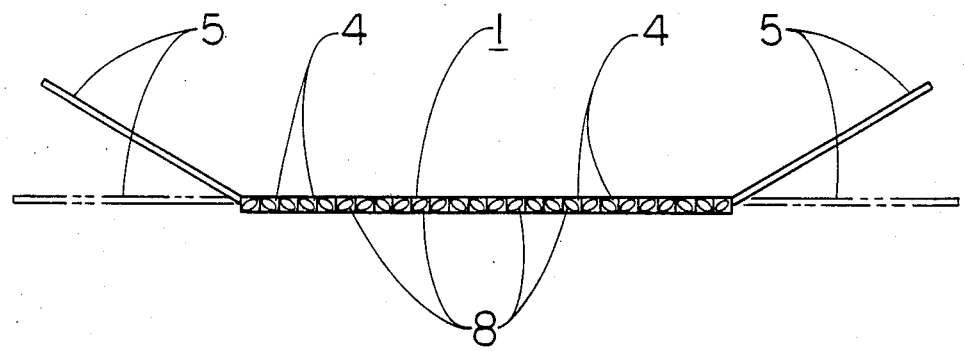
FIG. 5 is a section elevation showing the device being folded or unfolded.

Referring to FIG. 5, there is shown a section elevation of the popcorn sheet 1 as it is being folded or unfolded. The support panels 5 are shown in the open position as phantom lines and the closing or opening position is shown in solid lines. The corn kernels 8 are shown contained in the popcorn kernel chambers 4.

Figure 6:
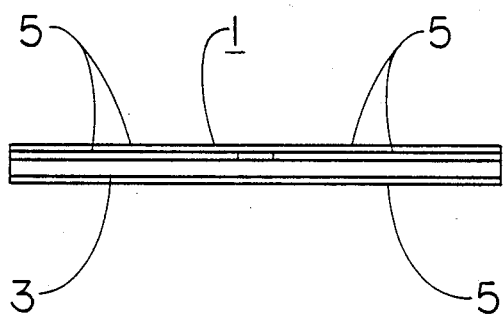
FIG. 6 is a section elevation of the folded device of the preferred embodiment.

Referring to FIG. 6 there is shown an elevation of the popcorn sheet 1 in a completely folded condition as it would be in a wrapper on a store shelf. The support panels 3 are shown folded over one another.

Figure 7:
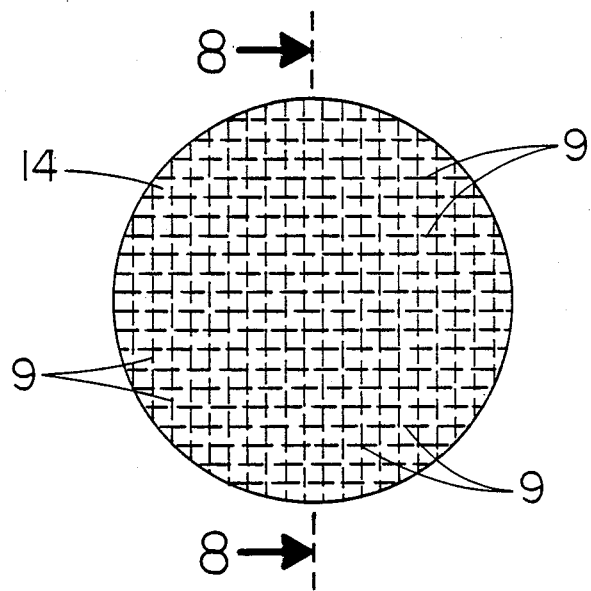
FIG. 7 is a plan view of a round configuration of the preferred embodiment.

Referring to FIG. 7, there is shown a plan view of another configuration of the preferred embodiment.

The popcorn panel 14 is round, but it could be square, rectangular, triangular, or any other configuration. The popcorn panel 14 is shown with chamber walls 9 as hidden lines.

Figure 8:
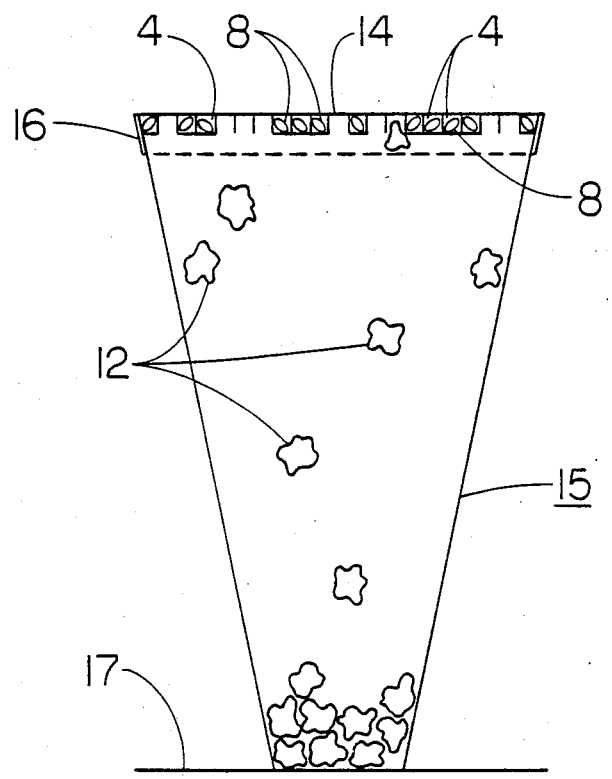
FIG. 8 is a section elevation as taken through FIG. 7.

Referring to FIG. 8, there is shown a section elevation as taken through FIG. 7.

The popcorn panel 14 is shown at the top of the container 15. The corn kernels 8 are shown being held in the popcorn kernel chambers 4 which makes up the popcorn panel 14. There is also popped corn 12 as it falls from the popcorn panel 14 into the container 15.

The popcorn panel 14 is shown suitably fastened to the container 15 by tape 16 that goes around the entire circumference of the popcorn panel 14 and the container 15 to make a airtight seal. When the corn is popped and the container 15 is full of popped corn 12, the tape 16 is removed and the popcorn panel 14 is thrown away.

The container 15 is expanded from a folded position as will be shown in FIG. 9 by means of a gas charge or a charge of steam from the popped corn 12. At the bottom of the container 15 is a stand 17 that will balance the container 15 as the popped corn 12 is popped and the container 15 expands.

Referring to FIG. 9, there is shown an outside elevation of the container 15 in a compressed condition. This would be similar to the configuration of the container 15 when it is in a package on the store shelf 18 or some other suitable storage location. It could even be compressed more to take up less space.

The container 15 itself is shown compressed between the stand 17 and the popcorn panel 14. The stand 17 is further shown setting on a shelf 18.

Referring to FIG. 10, there is shown an elevation of still another configuration of the preferred embodiment.

The popcorn panel 19 is shown in a rectangular configuration with the chamber walls 9 as hidden lines. The popcorn panel 19 forms part of the container 20. The container 20 also has side walls 10 that are triangular in shape not shown in this view.

Referring to FIG. 11, there is shown a section elevation as taken through FIG. 10.

There is a popcorn panel 19 shown with three legs forming a triangular shaped container 20. The side legs 170 have the popcorn panels 19, while the base leg 171 is the base and part of the container 20. The popcorn kernel chambers 4 are suitably fixed to the popcorn panel 19 in the same manner as the two other embodiments. As the corn kernels 8 pop into popped corn 12, they burst through the burst panel 21 and are held by the container 20. The popped corn 12 is held inside of the container 20 by side legs 170, the base leg 171, and the side walls 10. The side walls are on each side of the container 20.

Referring to FIG. 12, there is shown a section elevation of the triangular shaped container 20 in a folded position as it would appear on a grocery store shelf 18; it would be wrapped in a suitable package.

Figure 13:
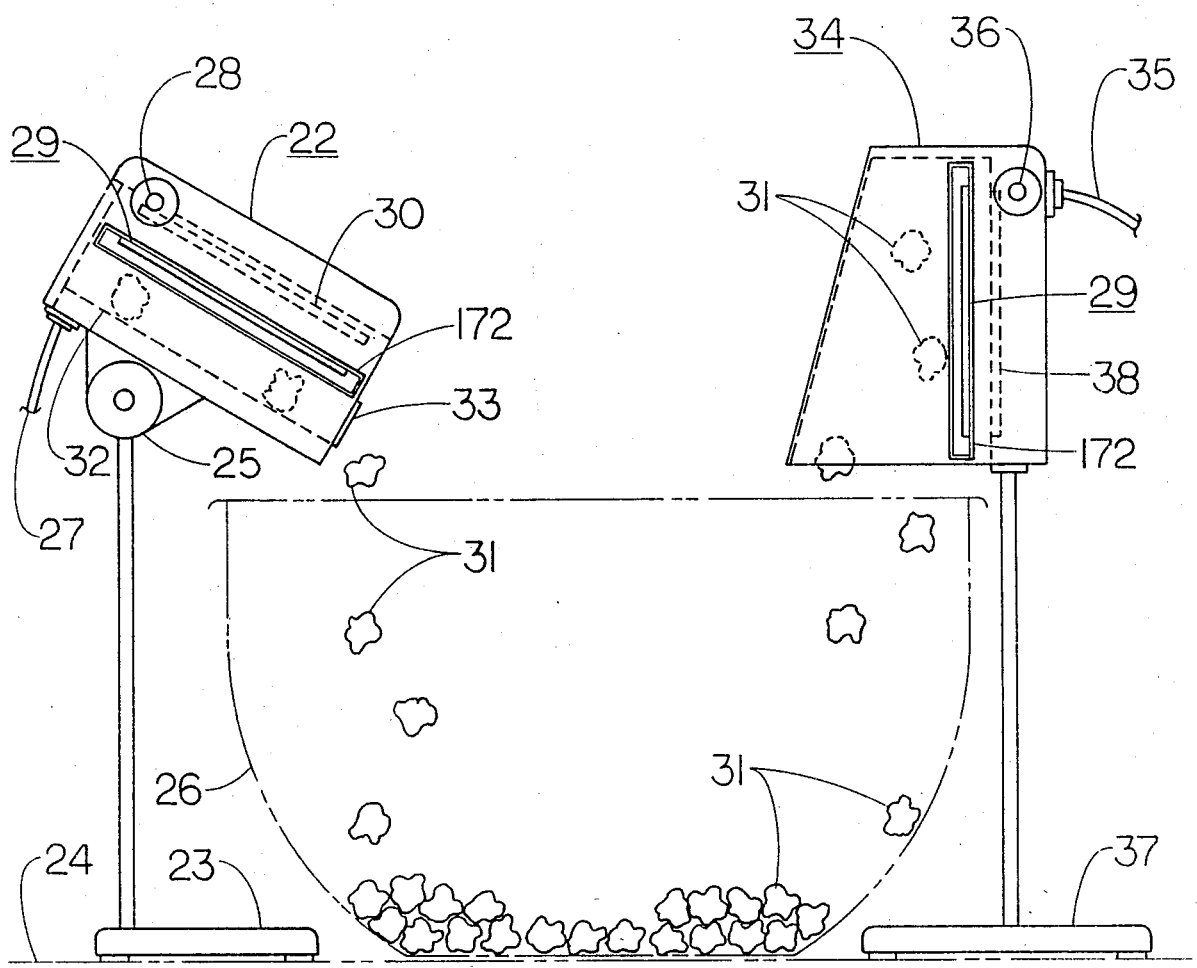
FIG. 13 is an elevation showing the device as it would be used with a conventional heating element.

Referring to FIG. 13, there is shown an elevation of still another configuration of the preferred embodiment.

The devices that were described in FIGS. 1 through 12 are designed to operate in a microwave oven; the devices that will be shown in FIGS. 13 through FIG. 25 are for induction heat means.

In FIG. 13, there are two configurations of the same type of popcorn poppers.

The sloping popper 22 is an oven with an inside and an outside. The sloping popper on the left side is shown on a stand 23. The stand 23 is setting on a counter top 24 or another suitable surface. The stand 23 is connected to sloping popper 22 by a suitable adjustable pivot mount 25 that is common in the industry. The adjustable pivot mount 25 will allow the angle on the sloping popper 22 to be adjustable to suit a particular bowl 26.

The sloping popper 22 has a suitable electric power line 27 connected to it for power; this could also be a suitable gas line if necessary. An electric switch 28 for on and off or heat selection is located near the top of the sloping popper 22. A corn cassette 29 is shown inserted into a cassette slot 172 in the side of the sloping popper 22 where a heating element 30 will heat up the corn kernels not shown in this view causing the corn kernels to pop into popped corn 31. The popped corn 31 will pop out of the corn cassette 29, onto the sloping floor 32 of the sloping popper 22 where it will further fall out of the mouth 3 of the sloping popper 2 and into the bowl 26 or some other suitable container.

The vertical popper 34 on the right side of FIG. 13 is an oven with an inside and an outside similar to the sloping popper 22, only the corn cassette 29 is in a vertical position. The vertical popper 34 has connected to it an electric power line 35, an on and off switch 36 a stand 37 and a heating element 38.

The corn cassette 29 is inserted into a cassette slot 172 in the side of the vertical popper 34 in a vertical position. The heating element 38 is turned on and heated. The heat causes the corn kernels to pop into popped corn 31 which falls into the bowl 26.

Figure 14:
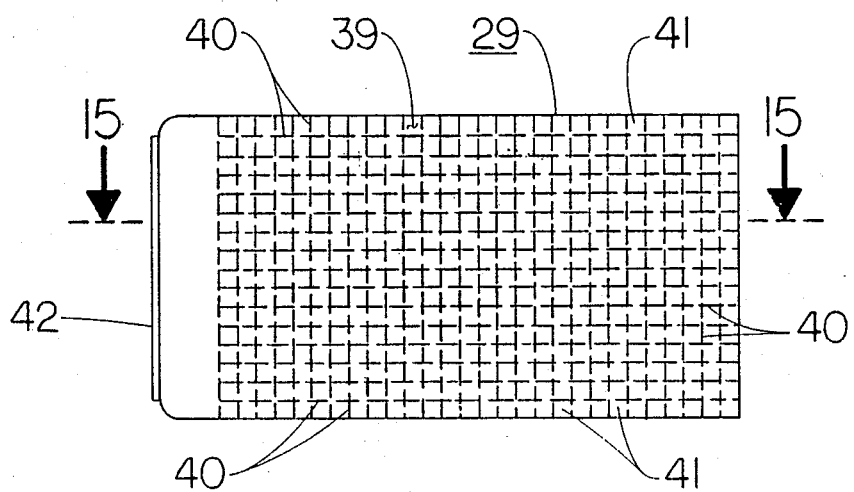
FIG. 14 is a plan view of the popcorn cassette.

Referring to FIG. 14, there is a plan view of the corn cassette 29.

The corn cassette 29 is composed of a cover panel 39 that is made of plastic, metal or some other suitable material that will conduct heat or allow heat to pass through it but will not break up when the corn kernels pop. On the other side of the cover panel are the chamber walls 40 that form the popcorn kernel chambers 41 that will hold the popcorn kernels not shown in this view. The chamber walls 40 are slightly higher than a popcorn kernel. At one end of the corn cassette 29 is the finger grip 42 that will allow a person to grip the corn cassette 29 to put it into the popper or to remove it from the popper.

Figure 15:
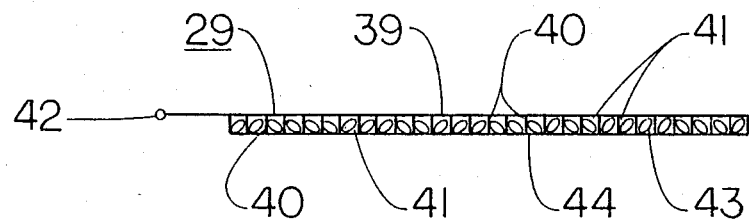
FIG. 15 is a section elevation of the popcorn cassette as taken through FIG. 14.

Referring to FIG. 15, there is shown a section elevation of the corn cassette 29 as taken through FIG. 14.

The cover panel 39 is shown over the corn kernels 43. The chamber walls 40 are shown separating each corn kernel 43 from one another. The combination of the chamber walls 40 and the cover panel 39 form the popcorn kernel chamber 41 which will isolate each corn kernel 43 when it pops or explodes and prevents it from affecting the corn kernels 43 in the adjacent popcorn kernel chambers 41. Below the corn kernels 43 is the burst panel 44. The burst panel 44 will hold the corn kernels 43 in the popcorn kernel chambers 41 before they pop or explode. The burst panel 44 is made out of tissue paper, or wax paper or aluminum foil or some other suitable material that is safe and will tear away when the corn kernels 43 pop or explode forming popped corn as in FIG. 13. The burst panel 44 could also be required to contain popcorn oil, salt and other suitable flavoring for popcorn flavor without breaking down or running through.

Figure 16:
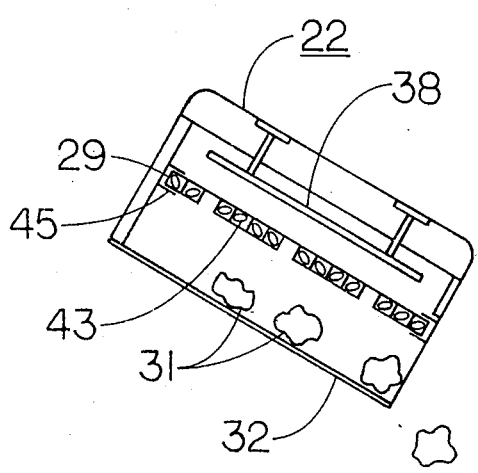
FIG. 16 is a section elevation of a sloping popper as taken through one of the devices of FIG. 13.

Referring to FIG. 16, there is shown a section elevation of the sloping popper 22.

The corn cassette 29 is shown held in place by the cassette guides 45 on each side of the corn cassette 29. Above the corn cassette 29 is the heating element 38 that heats the corn kernels 43. When the corn kernels are sufficiently heated, they pop into popped corn 31. The popped corn 31 will fall into the sloping floor 32 and further slide down the floor 32 and fall out of the sloping popper 22.

Figure 17:
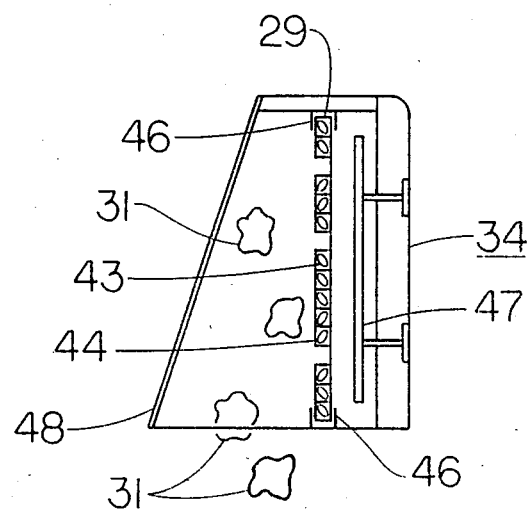
FIG. 17 is a section elevation as taken through the other device of FIG. 13.

FIG. 17 is a section elevation of the vertical popper 34.

The corn cassette 29 is slid into the cassette guides 46 in a vertical position. The heating element 47 heats up the corn kernels 43 until they pop. When the corn kernels pop into popped corn 31 they burst through the burst panel 44 and bounce off of the retainer wall 48 and further fall out of the vertical popper 34.

Figure 18:
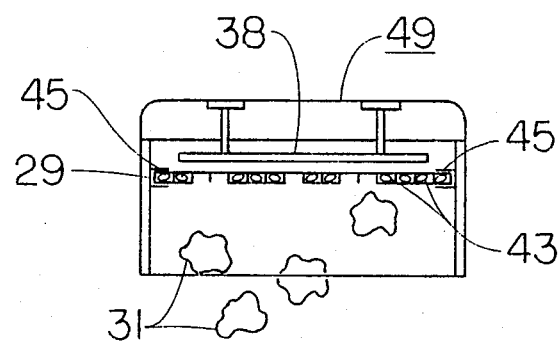
FIG. 18 is a section elevation of still another configuration of a popcorn popper similar to FIGS. 16 and 17.

Referring to FIG. 18 there is shown a section elevation of a horizontal popper 49.

The corn cassette 29 is inserted in the side of the horizontal popper 49 in the same manner as the two poppers in FIG. 13. The corn cassette 29 is held in place by the cassette guides 45. The corn kernels 43 are heated by the heating element 38 until they burst into popped corn 31. The popped corn 31 will fall down into any suitable bowl or container.

Figure 19:
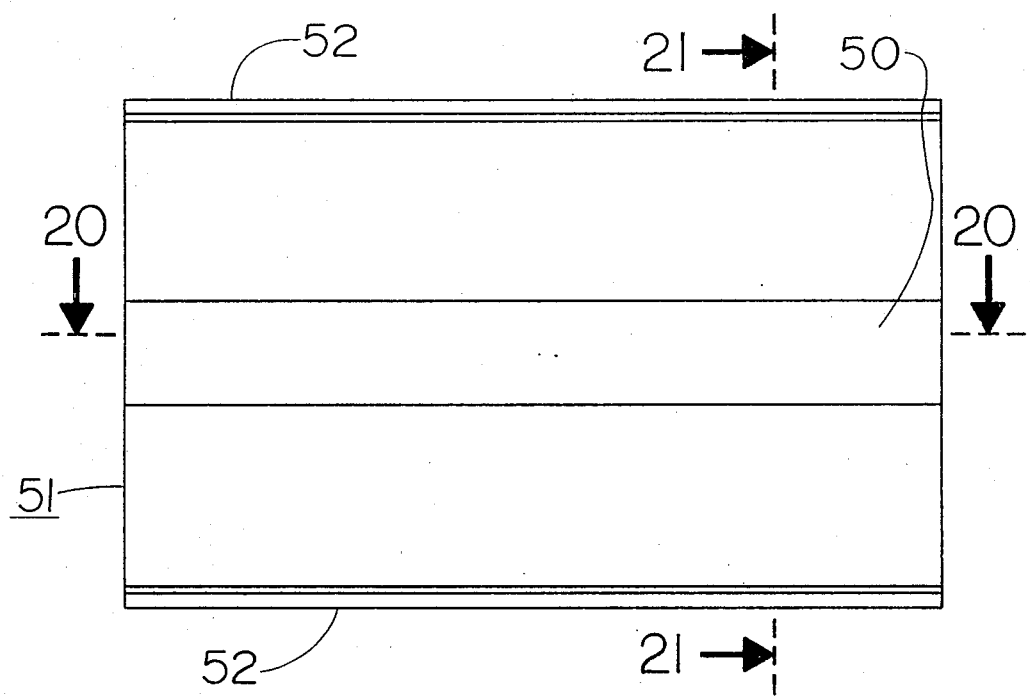
FIG. 19 is a plan view of another embodiment of a popcorn popping device.

Referring to FIG. 19, there is shown a plan view of still another embodiment of a popcorn popping system. The container 51 shown in the plan view is already open and expanded.

On the top is a microwave inhabiter 50 that will prevent microwaves from reaching and burning the popped corn. On each side of the container 51 are the pull open tabs 52.

Figure 20:
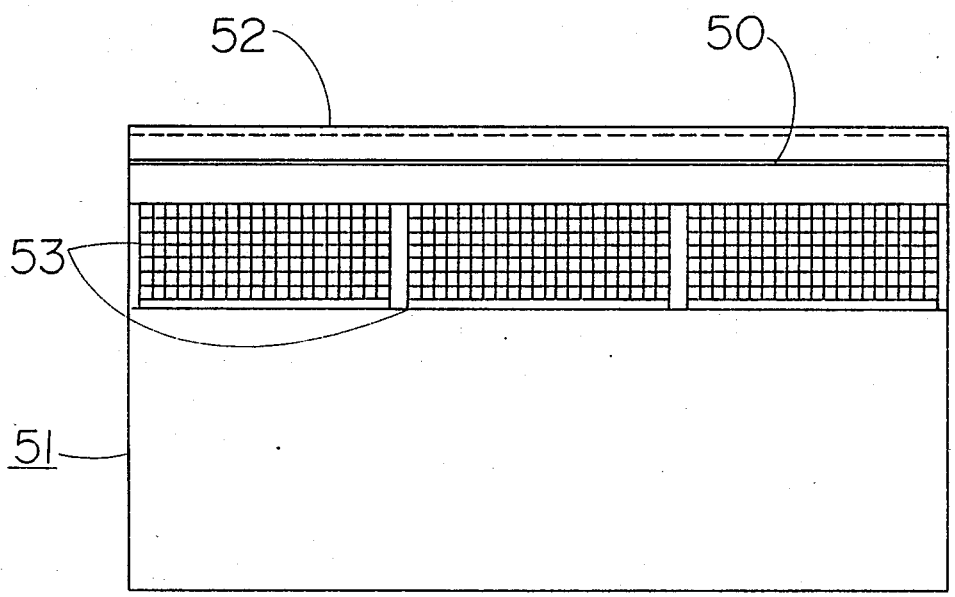
FIG. 20 is a section elevation as taken through FIG. 19.

Referring to FIG. 20, there is shown a section elevation as taken through FIG. 19.

The pull open tab 52 is shown at the top of the container 51. Also shown is the microwave inhabiter 50 that will reduce or eliminate the microwaves in a certain area. The corn kernels are contained in the sectioned tray 53.

Figure 21:
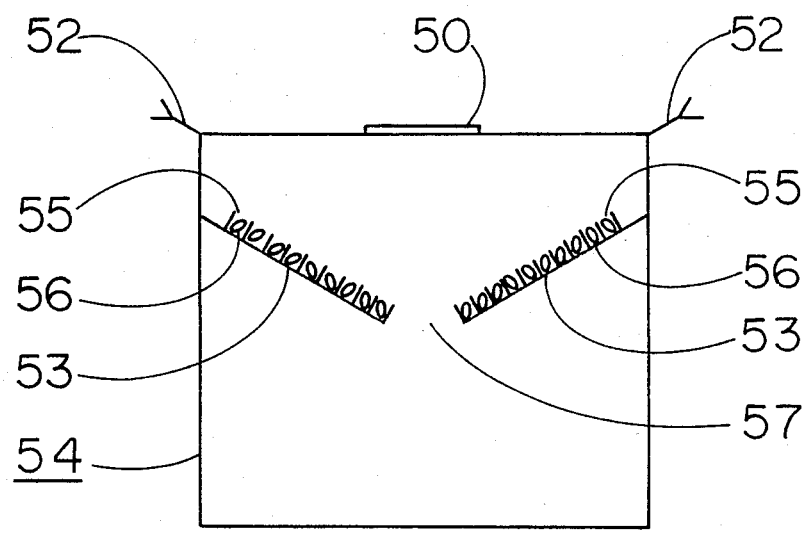
FIG. 21 is a section elevation as taken through FIG. 19.

Referring to FIG. 21, there is shown another section elevation as taken through FIG. 19 of an open chamber popper 54. The corn kernel chambers 55 are open because the corn kernels 56 are held in place by gravity when the corn is being popped and therefore a paper, plastic or foil cover is not necessary to contain or hold the corn kernels 56.

The microwave inhabiter 50 is shown located over the gap 57 between the sectioned trays 53. The pull open tabs 52 are shown at the top of each side of the container 51.

Figure 22:
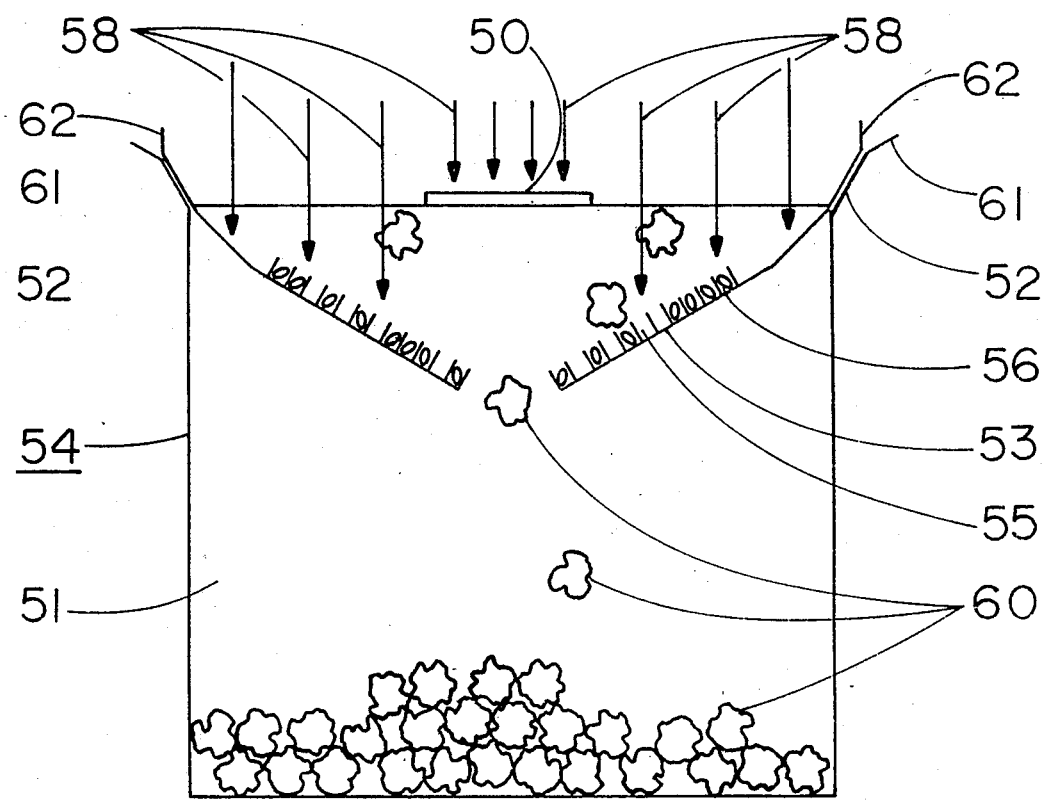
FIG. 22 is an enlarged section elevation similar to FIG. 21, taken through FIG. 19.

Referring to FIG. 22, there is shown an enlarged section elevation of open chamber popper 54.

The microwaves 58 are shown penetrating the cover panel 59 of the open chamber popper 54, but the microwaves 58 are stopped at the microwave inhabiter 50 and the sectioned trays 53. When the corn kernels 56 pop into popped corn 60, they pop out of the corn kernel chambers 55; the popped corn 60 rolls down the sloping sectioned trays 53 and falls through the gap 57 and into the container 51. The microwave inhabiter 50 and the sectioned trays 53, prevent the popped corn 60 from burning and yet concentrate the microwaves 58 on the corn kernels 56 which are also elevated to a height closer to the source of the microwaves 58. The corn kernels 56 can be placed into the corn kernel chambers 55 with the desired amounts of cooking oil, salt or other suitable flavoring.

To open the container 51, the horizontal tab 61 of the pull open tab 52 is grasped with one hand and the vertical tab 62 of the pull open tab 52 with the other hand and the two tabs 61 and 62 are pulled apart. The adhesive holding the two tabs together is made of a suitable material that will not burn or break down under heat, but will unstick or allow the tabs 61 and 62 to be pulled apart. When the tabs are pulled apart, the heat rushing out will not touch the fingers or thumbs of the person opening the container. The cover panel 59 and the sectioned trays 53 will just be disposed of, leaving a container 51 of popped corn 60 to eat.

Figure 23:
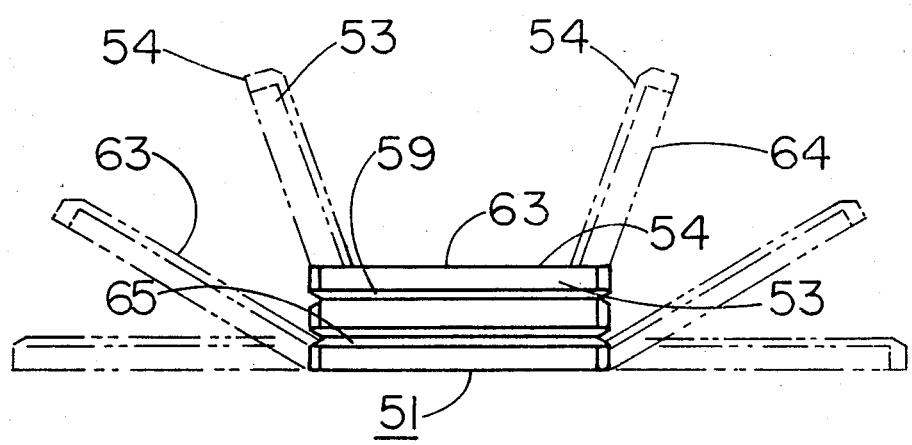
FIG. 23 is an elevation of the package of corn kernels describing how the package will be opened.

Referring to FIG. 23, there is shown a folded container 51 as it would appear on a store shelf and how it will be opened.

The open chamber popper 54 is folded into three sections. The cover panel 59 is pressed over the sectioned tray 53, thus preventing the corn kernels from falling out of the corn kernel chambers.

The top section 63, would be pulled open first, exposing the center section 64. The center section 64 would be pulled open second, exposing the lower section 65, thus opening the open chamber popper 54 for insertion into the microwave oven.

Figure 24:
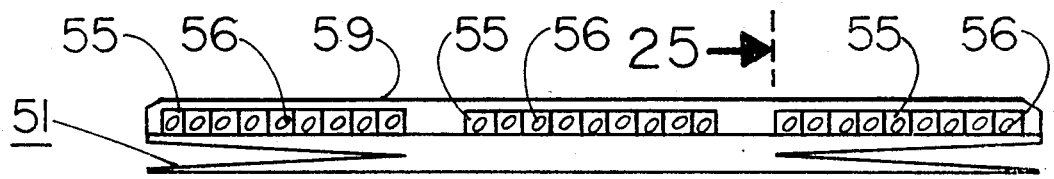
FIG. 24 is an elevation of the package of corn kernels in an unfolded position.

Referring to FIG. 24, there is shown a section elevation of the open chamber popper 54 unfolded and ready for insertion into a microwave oven.

The container 51 is folded so that the corn kernels 56 or a charge are placed in the container 51 when it is packaged will cause it to unfold and expand when heated. The cover panel 59 is shown to be over the corn kernel chambers 55 preventing the corn kernels 56 from falling out during shipping and handling.

Figure 25:
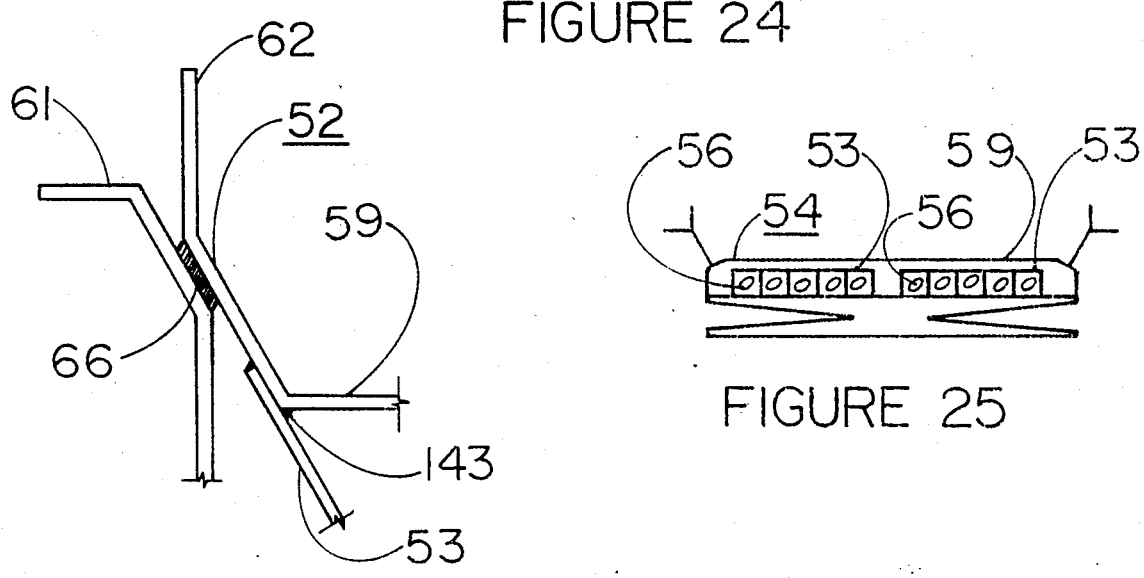
FIG. 25 is a side elevation of the package of corn kernels in an open position as taken through FIG. 24.

Referring to FIG. 25, there is shown a side section elevation as taken through FIG. 24 of the open chamber popper 54.

The cover panel 59 is shown as touching or near touching the top of the sectioned tray 53 to prevent the corn kernels 56 from falling out during handling.

Figure 26:
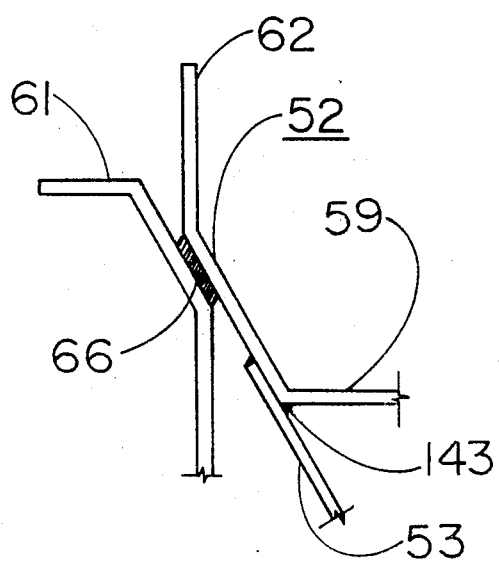
FIG. 26 is an enlarged section elevation of the upper corners of the package as taken from FIG. 22.

Referring to FIG. 26, there is shown an enlarged section elevation of the pull open tab 52.

The pull open tab 52 has a horizontal tab 61 and a vertical tab 62 that are held together by a suitable adhesive 66 or glue. The adhesive 66 will allow the vertical tab 62 to be pulled away from the horizontal tab 61 without tearing any of the material that comprises the container 51 or the cover panel 59. When the horizontal tab 61 is pulled away from the vertical tab 62, the fingers and thumbs are protected from the escaping steam held within the container. The sectioned tray 53 is also fastened with a suitable glue 143 to the cover panel 59 in a manner that will not allow them to separate when the tabs are pulled apart.

Figure 27:
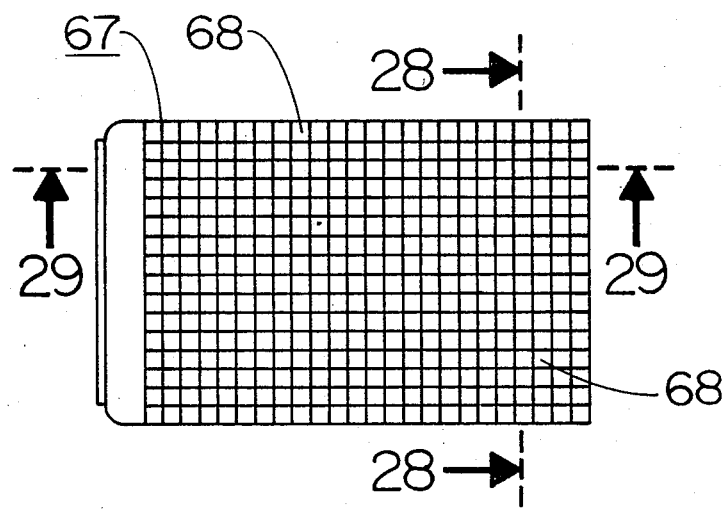
FIG. 27 is a plan view of another popcorn cassette of another embodiment.

Referring to FIG. 27, there is shown a plan view of an open chamber cassette 67.

The open chamber cassette 67 is made of aluminum or some other suitable metal or even a suitable non-metallic material. It is divided into corn kernel chambers 68 and each corn kernel chamber 68 is just large enough to contain one corn kernel. There is also a finger grip 70 at one end of the open chamber cassette 67 to grip when pushing the cassette 67 in or pulling it out of the popper.

Figure 28:
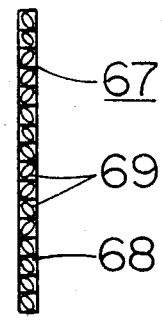
FIG. 28 is a section elevation as taken through FIG. 27.

Referring to FIG. 28, there is shown a section elevation as taken through FIG. 27 of the open chamber cassette 67. The corn kernels 69 are shown inserted into each corn kernel chamber 68.

Figure 29:
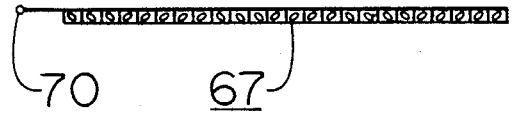
FIG. 29 is still another section elevation as taken through FIG. 27.

Referring to FIG. 29, there is shown another section elevation as taken through FIG. 27.

The finger grip 70 is shown at one end of the open chamber cassette 67.

Figure 30:
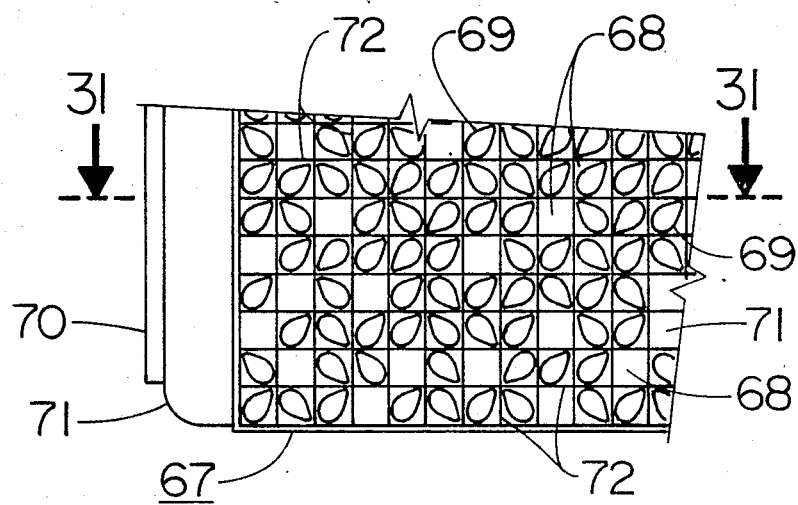
FIG. 30 is an enlarged plan view of a part of FIG. 27.

Referring to FIG. 30, there is shown an enlarged plan view of part of the open chamber cassette 67. The corn kernels 69 are contained in the corn kernel chambers 68. In those corn kernel chambers 68 where there are no corn kernels 69, the corn has already popped. The corn kernel chambers 68 are made up of the lower panel 71 on the bottom and the chamber walls 72 on the side. The finger grip 70 is also shown.

Figure 31:
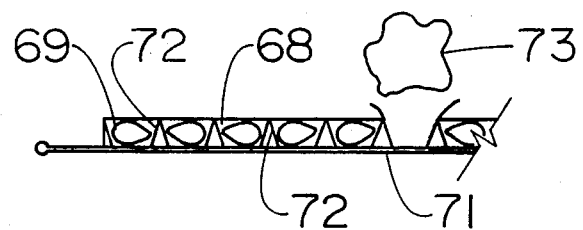
FIG. 31 is a section elevation taken through FIG. 30.

Referring to FIG. 31, there is shown a section elevation as taken through FIG. 30. The corn kernels 69 are shown contained in the corn kernel chambers 68 made up of the chamber walls 72 and the lower panel 71. The corn is shown popping up into popped corn 73.

The chamber walls 72 are shown in greater detail. The chamber walls have a slight batter or slope to them to allow the popping corn to easily move out of the corn kernel chambers.

Figure 32:
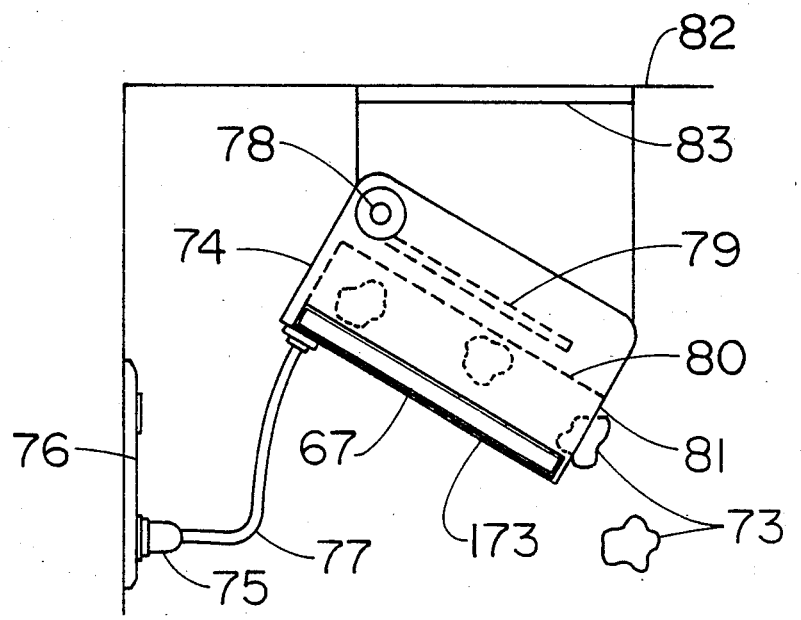
FIG. 32 is a side elevation of a popcorn popping device suspended from the bottom of a cupboard.

Referring to FIG. 32, there is shown an inclined popper 74.

The inclined popper 74 will use an open chamber cassette 7. The open chamber cassette 67 is shown inserted into the cassette slot 173 in the side of the inclined popper 74. The inclined popper 74 is further shown receiving its power from an electric plug 75 in a wall outlet 76; an electric cord 77 carries the power from the plug 75 into the inclined popper 74 where it runs through a switch 78 and into the heating element 79.

To operate, the open chamber cassette 67 is inserted into the inclined popper 74. The heating element 79 is heated and causes the corn kernels to heat up and pop into popped corn 73. When the corn pops, it strikes the screen 80 which prevents it from touching the heating element 79 and burning. The popped corn 73 rolls down the open chamber cassette 67 and falls out of the mouth 81 of the inclined popper 74 and into a suitable container.

The inclined popper 74 shown is an overhead mounted unit fastened to the under side of a cupboard 82 or a shelf or some other suitable item by a suitable overhead mounting 83. There are many types and means of mounting a device overhead so this type is a matter of design choice.

Figure 33:
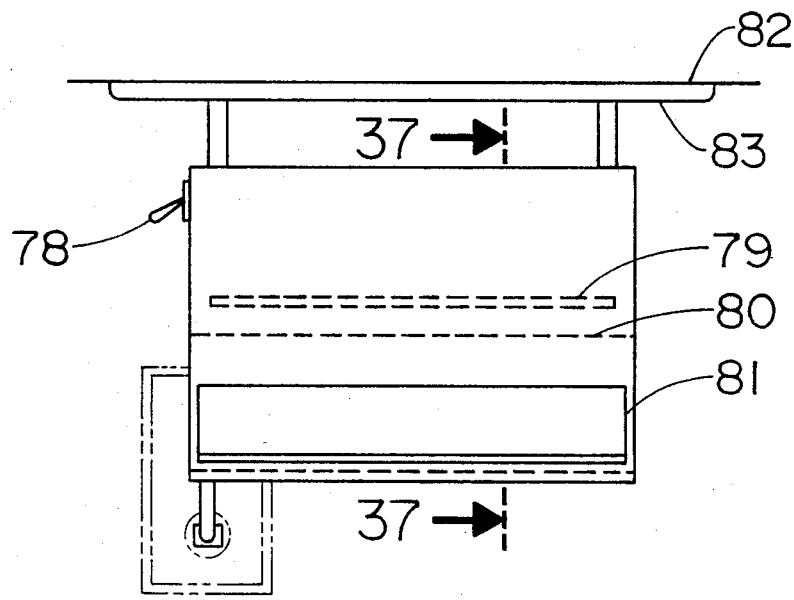
FIG. 33 is a frontal elevation of the cupboard mounted popcorn popping device of FIG. 32.

Referring to FIG. 33, there is shown an elevation of the inclined popper 74.

The mouth 81 extends almost the entire length of the inclined popper 74. The screen 80 is above the mouth. The heating element 79 is shown above the screen 80. The overhead mounting device 83 is shown mounted to the bottom of a cupboard 82. The switch 78 is shown on the left hand side. The location and type of switch 78 is a matter of design choice.

Figure 34:
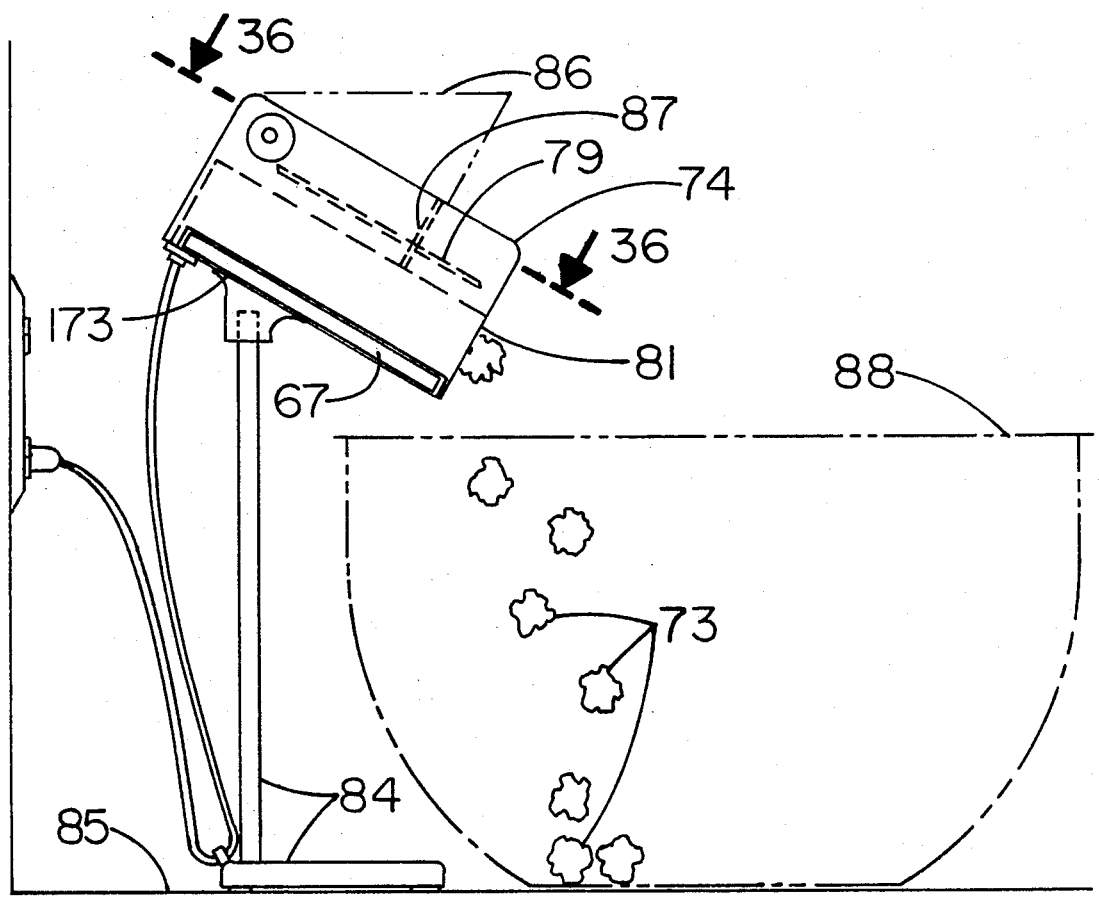
FIG. 34 is an elevation of a self standing popcorn popping device.

Referring to FIG. 34, there is the inclined popper 74 on a pedestal 84.

The pedestal 84 is shown setting on a counter top 85 or another suitable surface. The inclined popper 74, an oven with an inside and an outside, is also shown with a butter spreader 86. The butter spreader 86 is a hopper that holds butter or other suitable flavoring and further melts the butter with the heat of the heating element 79 or another heating element not shown. The melted butter will just drain down a series of tubes 87 and drip on the popped corn 73 as it rolls down the open chamber cassette 67.

All other parts of the inclined popper of FIG. 34 are the same as FIG. 32. The open chamber cassette 67 is inserted into the cassette slot 173 of the inclined popper 74, the heating element heats up the corn kernels that pop into popped corn 73 that falls out of the mouth 81 of the inclined popper and into a bowl 88 or some other suitable container.

Figure 35:
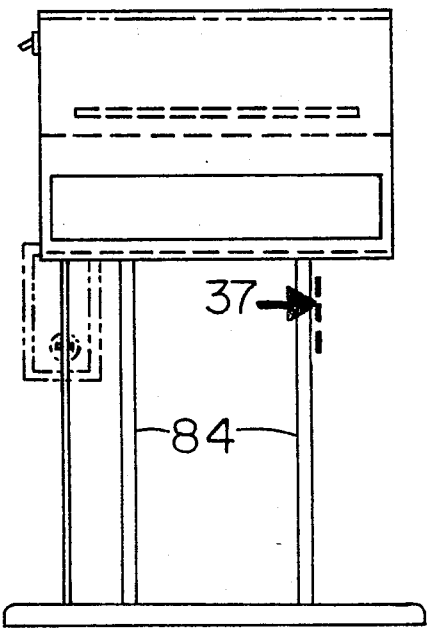
FIG. 35 is a frontal elevation of the free standing popcorn popping device of FIG. 34.

Referring to FIG. 35, there is shown an elevation of the inclined popper 74 on a pedestal 84. The inclined popper 74 of this view is the same as FIG. 33.

Figure 36:
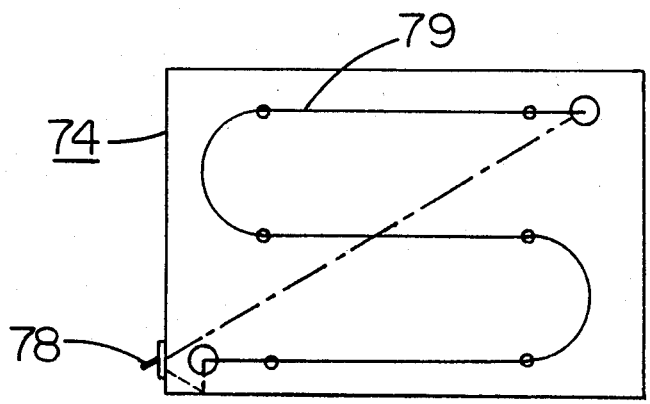
FIG. 36 is a sectional plan view of a heating element as taken through FIG. 34.

Referring to FIG. 36, there is shown a section view of the heating element 79 and the switch 78 in the inclined popper 74 as taken through FIG. 34.

Figure 37:
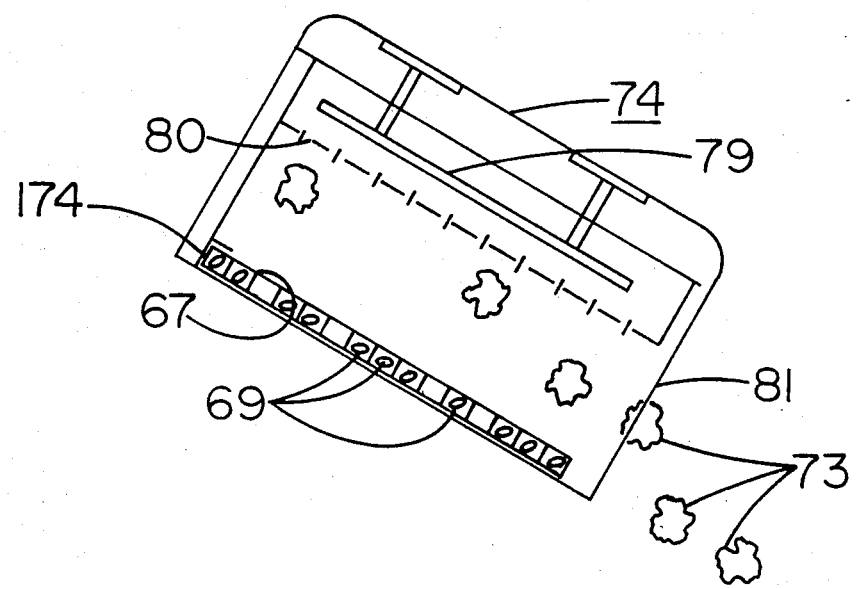
FIG. 37 is a section elevation as taken through FIG. 35.

Referring to FIG. 37, there is shown a section elevation of the inclined popper 74 as taken through FIG. 35.

The open chamber cassette 67 is shown inserted into the inclined popper 74 and is held in place by the cassette guides 174. As the corn kernels 69 pop into popped corn 73 they bounce into the screen 80 and further roll down the open chamber cassette 67 and out of the mouth 81. The corn kernels 69 are heated by the heating element 79.

Referring to FIG. 38, there is shown a plan view of the pedestal mounted inclined popper 74 over a bowl 88.

Referring to FIG. 39, there is shown a plan view of the inclined popper 74 on a wall mount device 89. The wall mount device 89 is shown suitably fastened to a wall 90.

Referring to FIG. 40, there is shown an elevation of the inclined popper 74 as it would be fastened to a wall 90 with a wall mount device 89.

Figure 41:
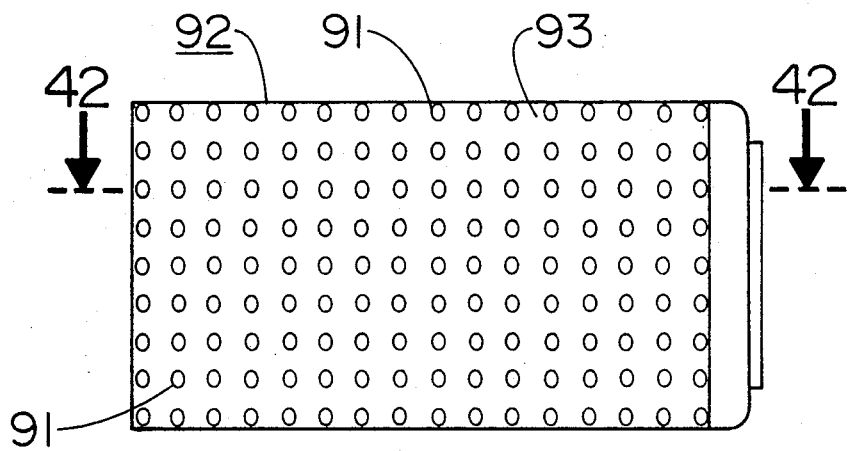
FIG. 41 is a plan view of a popcorn cassette with glue on corn.

Referring to FIG. 41, there is shown still another embodiment of a means of popping corn.

The corn kernels 91, are suitably attached to the corn cassette 92 by a suitable glue 93 or a suitable adhesive. The glue 93 or adhesive is a digestible non-toxic material that has no taste or enhances the taste of the popped corn that will hold the corn kernels 91 to the corn cassette 92 even in conditions of intense heat or cold or moreover in conditions where there is movement or possible vibrations. The corn cassette 92 will hold corn kernels 91 upside down or with the corn kernels 91 on top of the corn cassette 92. The corn cassette 92 is to be made of any suitable material by design choice.

When the corn cassette 92 is inserted into a heating device such as a microwave oven or a convection oven or a corn popper, the corn kernels 91 will be sufficiently heated until they explode or pop. When the corn kernels 91 explode or pop, the shock from the explosion or pop, combined with the change in shape of the corn kernel 91 into popped corn will dislodge the popped corn from the glue 93 or corn cassette 92.

Figure 42:
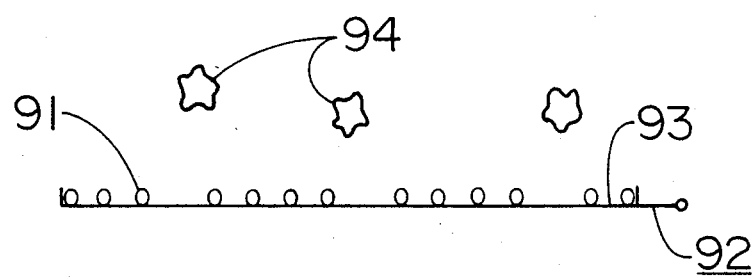
FIG. 42 is a section elevation of the popcorn cassette as taken through FIG. 41.

Referring to FIG. 42, there is shown a section elevation as taken through FIG. 41 of the corn kernels 91 glued to the corn cassette 92.

The corn cassette 92 of FIG. 42 is shown with the corn kernels 91 on top, but it could be used in an inverted position also. The corn kernels 91 could also be placed on both the top side and the underside of the corn cassette 92 at the same time. Some of the corn kernels of FIG. 42 are shown popping into popped corn 94.

The glue 93 can be applied to the corn kernels 91 which will then be placed on the corn cassette 92, or the glue 93 can be place on the corn cassette 92 in precise spots or over the entire corn cassette 92 and the corn kernels 91 can be applied afterward.

The corn cassette 92 with glued on corn kernels 91 can be used on the corn sheet of FIG. 1, FIG. 7, FIG. 10, the corn cassette of FIG. 13, 14, 16, 17, and 18, the sectioned tray of FIG. 20, 22 the open chamber cassette of FIG. 27, 30, 31, 32, 34, and 37.

Figure 43:
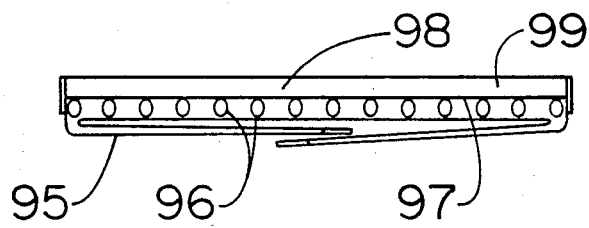
FIG. 43 is a section elevation of a folded bag with a glue on corn kernel panel.

Referring to FIG. 43, there is shown a section elevation of folded bag 95 with glue on corn kernels 96 and the corn panel 97.

The bag 95 is folded as it would appear on a store shelf or cupboard shelf at home, etc. The corn kernels 96 are shown glued onto the corn panel 97 in the same manner as with the corn cassette of FIGS. 41 and 42.

Above the corn panel 97 is a flavor chamber 98 that will hold butter, salt, or other suitable flavoring ingredients 99.

Figure 44:
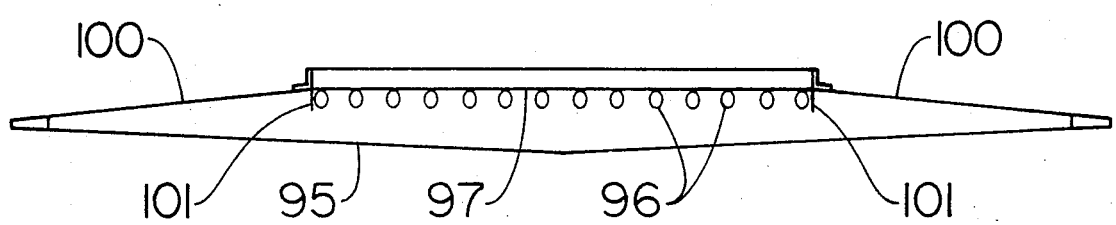
FIG. 44 is a section elevation of an unfolded bag with a glue on corn kernel panel.

Referring to FIG. 44, there is shown a section elevation of the bag 95 unfolded ready to be expanded. The end wings 100 are shown pulled out. The lip 101 is shown on each side of the corn panel 97 to prevent the bottom part of the bag 95 from rubbing off the corn kernels 96 while the bag 95 is folded.

Figure 45:
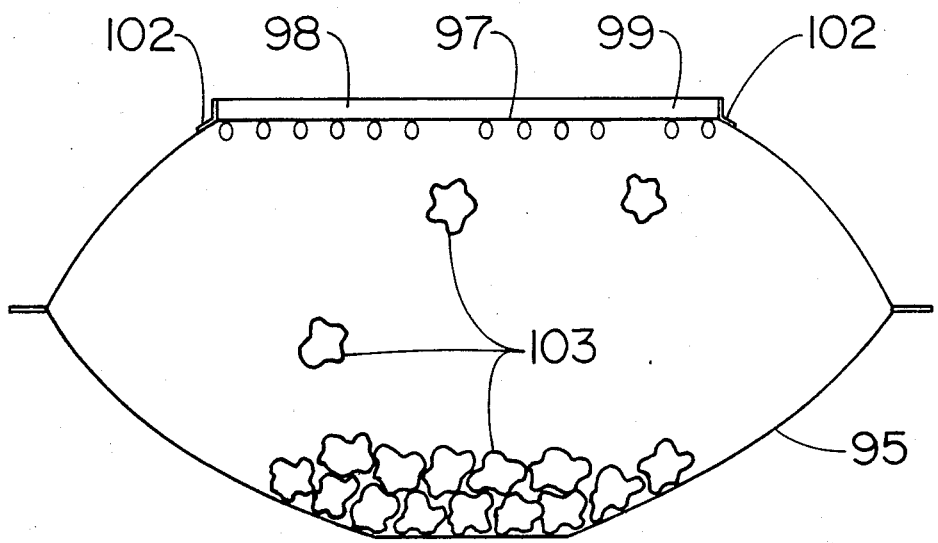
FIG. 45 is a section elevation of an expanded bag with a glue on corn kernel panel.

Referring to FIG. 45, there is shown a section elevation of the bag 95 after it has been expanded by a charge of heated gas that was either inserted into the bag or from out of the corn kernels 96 as they are popped.

The flavoring ingredients 99 are shown falling through small holes 142 in the corn panel 97. The flavoring ingredients 99 are melted in the flavor chamber 98 prior to filtering through the holes 142 in the corn panel 97.

The corn panel 97 and flavor chamber 98 are shown fixed to the bag 95 by tape 102. When the corn kernels 96 are popped into popped corn 103 and ready to be eaten, the tape 102 is removed and the corn panel 97 and flavor chamber 98 is removed from the bag with the tape 102 leaving a hole in the top of the bag 95 from which the popped corn 103 can be removed with the fingers and eaten.

Figure 46:
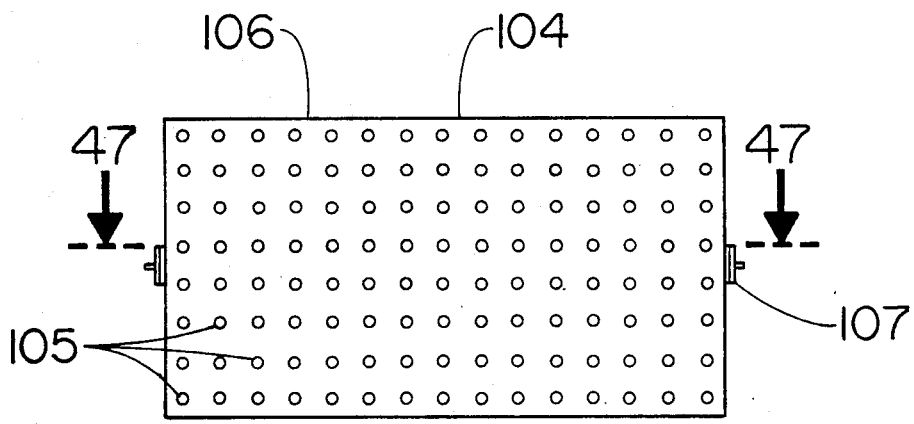
FIG. 46 is a plan view of a foam corn kernel block.

Referring to FIG. 46, there is shown a foam corn kernel block 104.

The foam corn kernel block 104 is made up of styrofoam or plastic or rubber or some other suitable material that is nontoxic and or digestible. The foam 106 acts as a base or foundation to support a mass of corn kernels 105. There are many possible shapes to the foam corn kernel block 104, it could be round, triangular, or square, etc. by design choice.

On each side of the foam corn kernel block 104 is a suspension means 107. The suspension means 107 supports the foam corn kernel block 104 on each side when in a bowl within a microwave oven. This will be further explained in FIG. 47.

Figure 47:
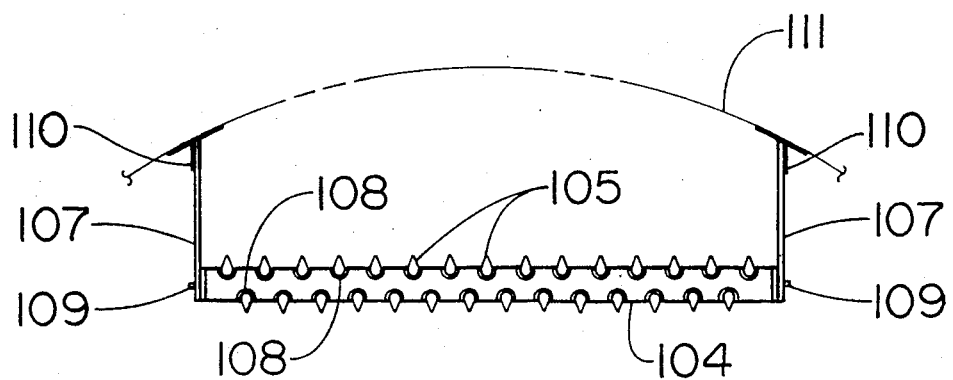
FIG. 47 is a section elevation of the foam corn kernel block as taken through FIG. 46.

Referring to FIG. 47, there is shown a section elevation as taken through FIG. 46 of the foam corn kernel block 104 with the corn kernels 105 inserted into the foam corn kernel block 104. Some of the corn kernels 105 are shown inserted into foam corn kernel block 104 with flavoring 108 such as oil, butter, or salt. The flavoring 108 can be inserted into the foam corn kernel block 104 before, during or after the corn kernels 105 have been inserted into the foam corn kernel block 104. The flavoring 108 will only come out after the corn kernel 105 has been popped.

The foam corn kernel block 104 is shown supported by a suspension means 107 that is suitably fixed to the corn kernel block 104 by a pin 109. The pin 109 is so fixed to the corn kernel block 104 that it will allow the corn kernel block 104 to rotate as the corn kernels 105 pop. The suspension means 107 is further fixed to the bowl cover 111 by tape 110.

Figure 48:
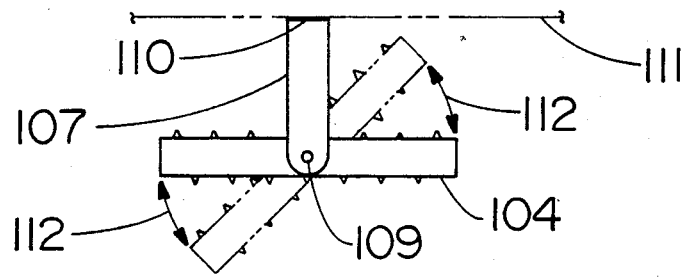
FIG. 48 is a side elevation view of the foam corn kernel block.

Referring to FIG. 48, there is shown a side elevation of the foam corn kernel block 104 on the suspension means 107.

The suspension means 107 is shown supported or held at the upper end to the bowl cover 111 by tape 110. At the lower end the pin 109 is shown fixed to the suspension means 107 and is further suitably fastened to the foam corn kernel block 104 to allow the corn kernel block 104 to rotate 112 in either direction as the corn pops.

Figure 49:
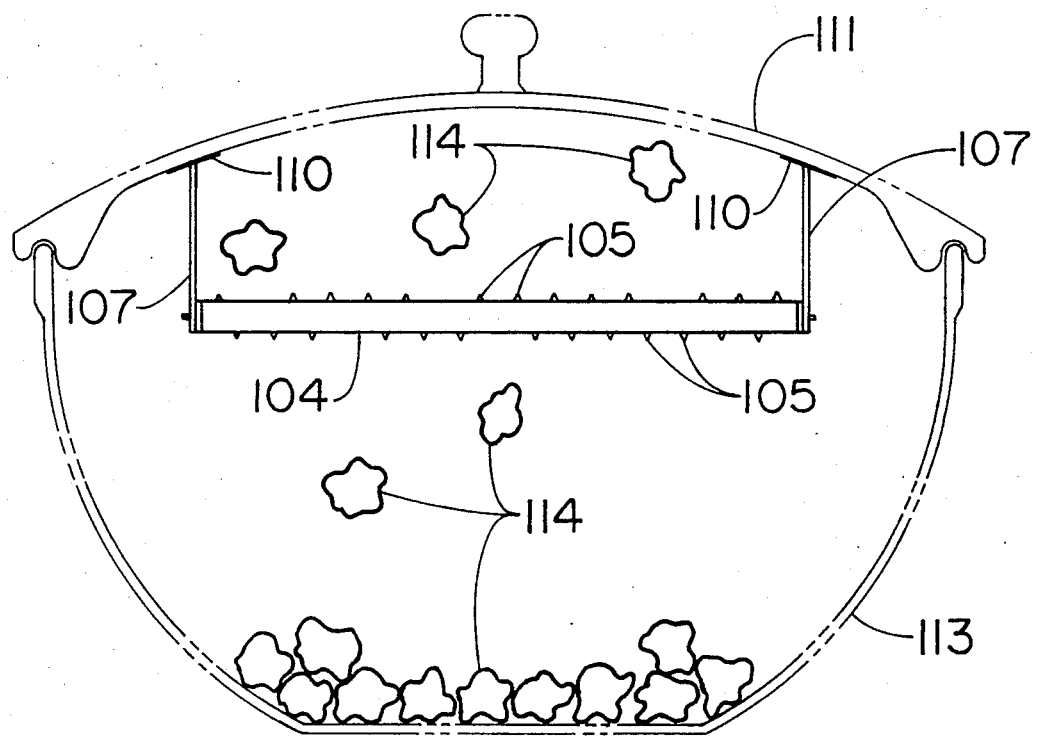
FIG. 49 is a section elevation of the corn kernel block in a bowl.

Referring to FIG. 49, there is shown a section elevation of the foam corn kernel block 104 in a bowl 113.

The foam corn kernel block 104 with the corn kernels 105 imbedded in the foam corn kernel block 104 is shown supported by the suspension means 107 that is held to the underside of the bowl cover 111 by tape 110.

The corn kernels 105 are shown popping into popped corn 114 and falling into the bottom of the bowl 113 which will also be a means of serving the popped corn 114.

When the corn kernels 105 are popped into popped corn 114, the foam corn kernel block 104 will be removed from the bowl cover 111 and will be reused or thrown away.

The corn kernels 105 are popped in the case of FIG. 49 by either a microwave oven or a convection oven not shown in this view, but shown in other views. The foam corn kernel block 104 could also be used as a corn cassette as shown in FIG. 13 and 32 or it could be shown as a corn kernel panel as shown in FIG. 2. It could also be used with a bag as shown in FIG. 45 all of which could be a matter of design choice.

Figure 50:
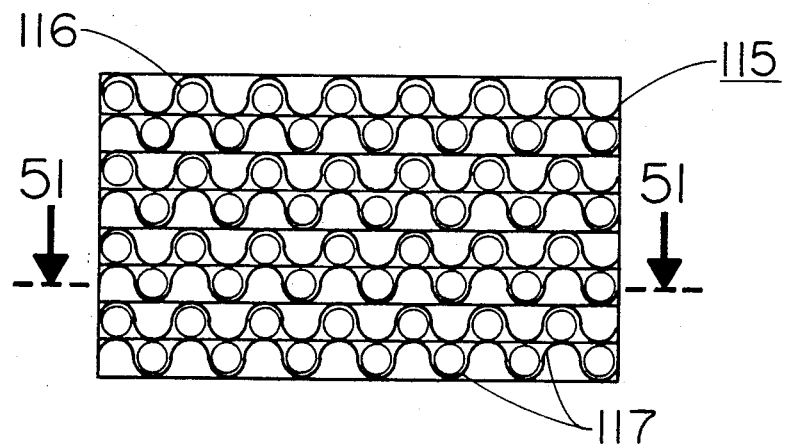
FIG. 50 is a plan view of a corrugated corn kernel cassette.

Referring to FIG. 50, there is shown a plan view of a corrugated corn kernel cassette 115. The cover panel is not shown in this figure for clarity.

The corn kernels 116 are shown inserted into the corrugations 117. The corn kernels 116 are held in place by friction if the cassette is used in an upside down position or they could be held in place by gravity if used in the position shown. They are also held in place by a cover panel if desirable. The corn kernels 116 are shown in a staggered position to allow the corn kernels 116 to pop without affecting the unpopped corn kernels 116. They could however be inserted into each corrugation 17 if desirable.

The corrugated corn kernel cassette 115 shown is made out of paper, however it could also be constructed of plastic or another suitable material. The corn kernel cassette 115 could also be made into a corn panel as shown in FIG. 1, a corn kernel cassette as shown in FIG. 13, a corn kernel chamber of FIG. 21 or with a corn bag of FIG. 45 or with the suspension means of FIG. 49. All of these would be a matter of design choice.

Figure 51:
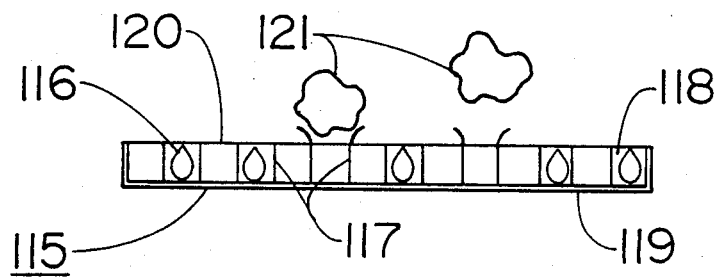
FIG. 51 is a section elevation of a corn kernel cassette as taken through FIG. 50.

Referring to FIG. 51, there is shown a section elevation of the corrugated corn kernel cassette 115 as taken through FIG. 50.

The corn kernels 116 are shown inserted into the corrugation 117. The corn kernels 116 are also shown with flavoring 118, such as butter or oil and salt, etc.

The corrugated corn kernel cassette 115 is shown with a bottom panel 119 that is suitably fastened to the corrugations 117 by glue or other suitable means. The bottom panel 119 will hold the shape of the corrugated corn kernel cassette 115 and will be a means of sealing the bottom of the corrugations in order to better contain the corn kernels 116 and the flavoring 118.

The corrugated corn kernel cassette 115 has a cover panel 120 that is made out of tissue paper or another suitable material that will easily tear when the corn kernels 116 pop into popped corn 121. The cover panel 120 will allow the corrugated corn kernel cassette 115 to be used in an inverted position, while holding the corn kernels 116 and flavoring 118 in place until the corn kernels 116 pop, thus releasing the popped corn 121 with the flavoring 118, thus assuring an even distribution or a constant ratio of popped corn 121 and flavoring 118.

The corrugated corn kernel cassette 115 could be used with the popcorn sheet of FIG. 1, the corn cassette of FIG. 13, the sectioned tray of FIG. 22, the inclined popper of FIG. 32, the bag of FIG. 45 and the bowl of FIG. 49.

FIG. 51a, 51b, 51c, and 51d show various methods of applying corrugations to popping corn.

Figure 51A:
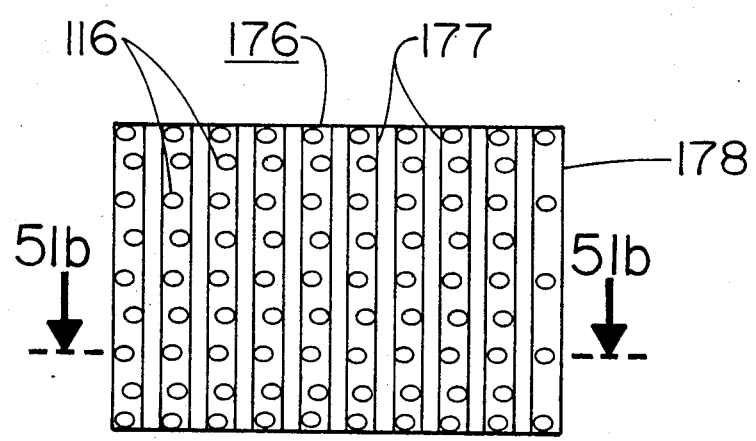
FIG. 51a is a plan view of a rectangular corrugation cassette.

FIG. 51a is a plan view of a rectangular corrugation cassette 176. The purpose of the rectangular corrugations 177 is to place more corn kernels 116 into a smaller area. Still another purpose of the rectangular corrugations 177 is to allow the paper 178 to absorb the shock of the corn kernels 116 a they explode into popped corn. The rectangular corrugation cassette 176 is made out of paper 178 or other suitable materials.

Figure 51B:
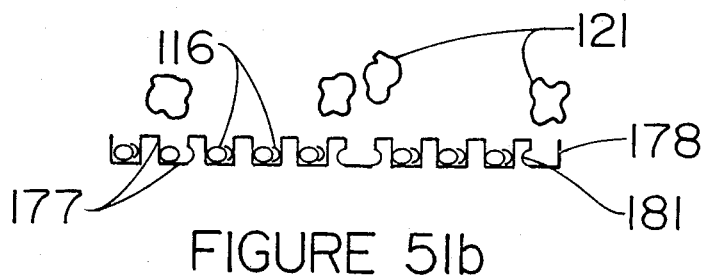

FIG. 51b is a section elevation of the rectangular corrugation cassette 176. The corn kernels 116 are shown fixed to the rectangular corrugations 177 with glue. As the corn kernels 116 are heated, they explode into popped corn 121. As they explode, they may temporarily or permanently deform the rectangular corrugations 177. The deformation 181 is caused by the paper 178 absorbing the energy of the exploding corn kernels 116 into popped corn 121. The ability of the rectangular corrugations 177 to absorb energy will prevent the corn kernels 116 next to the popping corn 121 from being dislodged; the paper 178 will act as a spring.

FIG. 51b is shown inverted for clarity; normally the corn kernels 116 are on the lower side of the rectangular corrugation cassette 176. The rectangular corrugation cassette 176 could be used in a vertical mode also.

Figure 51C:
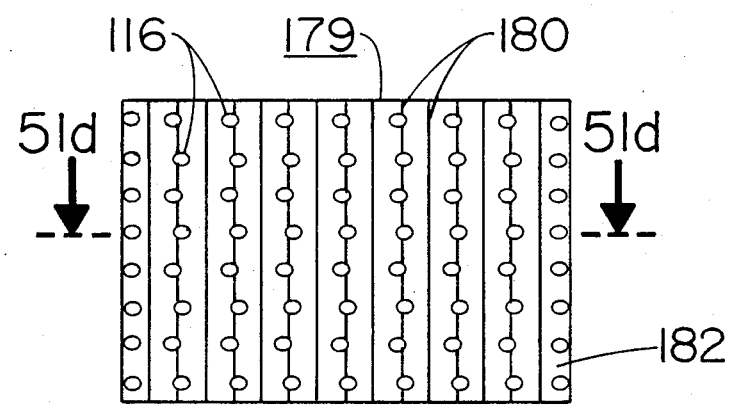
FIG. 51c is a plan view of a triangular corrugation cassette.

Referring to FIG. 51c, there is shown a plan view of a triangular corrugation cassette 179. The purpose of the triangular corrugations 180 is to place more corn kernels 116 into a smaller area. Still another purpose of the triangular corrugations 180 is to allow the paper 182 to absorb the shock of the corn kernels 116 as they explode into popped corn. The triangular corrugation cassette is made out of paper 182 or other suitable material.

FIG. 51c is a section elevation as taken through FIG. 51c.

The corn kernels 116 are shown fixed to the triangular corrugations 180 with glue. As the corn kernels 116 are heated, they explode into popped corn 121. As they explode, they temporarily or permanently deform the triangular corrugations 180. The deformation 183 is caused by the paper 182 absorbing the energy of the exploding corn kernels 116 into popped corn 121. The ability of the triangular corrugations 180 to absorb energy will prevent the corn kernels 116, next to the popping corn 121, from being dislodged; the paper 182 will act as a spring.

Figure 51D:
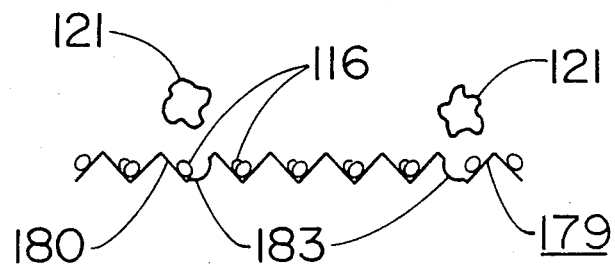
FIG. 51d is a section elevation as taken through FIG. 51c.

FIG. 51d is shown inverted for clarity; normally the corn kernels 116 are on the lower side of the triangular corrugated cassette 179. The triangular corrugation cassette 179 would also be used in a vertical mode.

Referring to FIG. 52, there is shown an elevation of still another embodiment of a corn popping means.

The corn kernel roller module 143 is shown setting on a stand 144. The stand 144 is shown setting on a base 145 which is setting on a suitable surface 146 such as a counter top. The corn kernel roller module 143 is placed over the stand 144 in a manner that will be shown later. The motor 150 is shown suitably fixed to the stand 144. A bowl 147 is also shown suitably located below the corn kernel roller module 143 in order to catch the popped corn as it falls from the corn kernel roller module 143.

Referring to FIG. 53, there is shown a plan view of the corn kernel roller module 143. Part of the stand 144 is shown in hidden lines inside of the corn kernel roller module 143. The bowl 147 is also shown partly below the corn kernel roller module 143.

Referring to FIG. 54 there is shown an elevation of the corn kernel roller module 143 on the stand 144.

Shown with hidden lines are the stand guides 148 and the module guides 149. As the corn kernel roller module 143 is lowered onto the stand 144, the stand guides 148 are held in place by the module guides 149 to assure proper alignment with the motor 150. Also shown is the base 145 setting on a suitable surface 146.

The motor 150 is shown suitably held in place near the stand 144 by a motor foundation 151. The motor foundation 151 is shown suitably fastened to the stand 144.

Referring to FIG. 55, there is shown an elevation of the stand 144 with the corn kernel roller module removed.

The stand 144 has a heating element 152 shown fixed to the back plate 153 of the stand 144. The heating element 152 is turned on by a switch not shown and the necessary safety devices to protect people; this would be a matter of design choice.

The motor 150 is shown supported on the motor foundation 151. At the center of the motor 150 there is a motor shaft 154 that projects out of the motor 150. The motor shaft 154 in section, is square or some other suitable shape, and it further fits into the corn kernel roller module.

Referring to FIG. 56, there is shown a section elevation of the corn kernel roller module 143 on the stand 144 as taken through FIG. 53.

The corn kernels 158 are fixed to the sheet 157 by a suitable glue or adhesive. The sheet 157 is made of a paper or other suitable material that will not burn or scorch. The sheet 157 is held in place by the sheet guides 156 located at the top and the bottom of the corn kernel roller module 143. The top sheet guide 156 is fixed to the top member 159 of the corn kernel roller module 143. The lower sheet guide 156 is fixed to the lower member 169 of the corn kernel roller module 143 by tabs 160. The tabs 160 are segments that hold the lower sheet guide 156 to the corn kernel roller module 143 while allowing the butter or other suitable flavoring 161 drip down into the bowl 147 and into the popped corn 162.

The cover sheet 153, in combination with the top member 159 and the lower member 169, forms a protective shell 175 around the corn kernel roll 167 and the sheet 157.

The corn kernels 158 are heated by the heating element 152 until they burst into popped corn 162. The screen 155 prevents the popped corn 162 from touching the heating element 152. When the popped corn 162 falls, it will fall through the lower opening 163 and be guided into the bowl 147 by the chute 164.

Referring to FIG. 57, there is shown a section view as taken through FIG. 56.

The sheet 157 with corn kernels 158 fixed to it, is shown rolled around an idler shaft 165. The other end of the sheet 157 is fixed to the drive shaft 166. The motor shaft 154 is inserted into the drive shaft 166; the exterior shape of the motor shaft 154 is the same as the interior shape of the drive shaft 166. The drive shaft 166 is rotated by the motor shaft 154. As the motor shaft 154 is turned by the motor, in this particular case in a counter clockwise direction, it causes the drive shaft 166 to rotate which causes the sheet 157 to roll around the drive shaft 166. As the sheet 157 rolls around the drive shaft 166, it pulls the sheet 157 off of the corn kernel roll 167. The sheet 157 is held in place by the sheet guide 156. The cover sheet 153 is shown protecting the sheet 157.

As the sheet 157 with the corn kernels 158 are pulled past the heating element 152, the heat causes the corn kernels 158 to pop into popped corn 162. When the corn kernels 158 pop into popped corn 162, they fall off of the sheet 157 and fall through the lower opening 163 in the lower member 169 and into the bowl. A screen 155 is placed between the sheet 157 and the heating element 152 to prevent the popped corn 162 from burning.

The corn kernel roller module 143 is shown held to the stand 144 by the module guides 149 and the stand guides 148.

Referring to FIG. 58, there is shown a section elevation of the sheet 157 as taken through FIG. 57.

The sheet 157 is shown held in place by the sheet guide 156. The corn kernels 158 are shown on the left side of the sheet 157, however, after most of the corn kernels 158 pop as they are moved past the heating element, there are very few left on the right side of the sheet 157. Also shown on the sheet 157 are the flavor beads 168 which contain suitable flavoring such as butter and/or salt. As the flavoring beads 168 are moved past the heating element, they heat up, and melt and fall on the popped corn.

Referring to FIGS. 59, 60 and 61, there are shown three elevations of the corn kernel roller module 143 being placed on the stand 144.

FIG. 59 shows the corn kernel roller module 143 above the stand 144. The motor shaft 154 is shown extending from the motor 150.

FIG. 60 shows the corn kernel roller module 143 being placed on the stand guide 148 to align the corn kernel roller module 143 with the stand 144 and the motor shaft 154.

FIG. 61 shows the corn kernel roller module 143 in place on the stand 144. The motor shaft is inside of the drive shaft and the unit is in a position to operate.

Referring to FIG. 62, there is shown an elevation of an open chamber cassette corn kernel feeder 122.

The corn kernel feeder 122 is a device that will be set in a counter top 123. The feeder unit 124 has a slot 125 of suitable size to insert a cassette 126. On top of the feeder unit is a jar 127 that contains corn kernels.

Referring to FIG. 63, there is shown a section view as taken through FIG. 62.

The cassette 126 is shown inserted into the slot 125 of the feeder unit 124. As the cassette 126 is inserted into the slot 125 of the feeder unit 124, the rack gear 128 forces the pinion gear 129 to rotate which further causes the feeder 130 to rotate. The pinion gear 129 and the feeder 130 are held in place within the feeder unit 124 by an axle 131 on each end of the feeder 130.

Referring to FIG. 64, there is shown another section view as taken through FIG. 62 showing the corn kernel guides 132 that guide the corn kernels 133 into the feeder. The corn kernel guides 132 are thin plates of sheet metal or some other suitable material that are suitably fixed to the upper section of the feeder unit 124. As the corn kernels 133 fall into the throat 136 of the feeder unit 124, they are aligned in single file to drop into the feeder 130.

Referring to FIG. 65, there is shown a section elevation of the corn kernel feeder 122 as taken through FIG. 62.

The corn kernels 133 are shown contained within the jar 127. The jar 127 is shown fastened onto the feeder unit 124 with threads 134. The jar 127 would be filled with corn kernels 133 and the feeder unit 124 would be fastened to the jar 127 while the jar 127 is in an upright position. The entire unit would be turned over as shown in FIG. 65.

The corn kernels 133 fall into the mouth 135 of the feeder unit 124 where they are guided by the corn kernel guides 132. The corn kernels 133 further fall into and through the throat 136 of the feeder unit 124 where they are caught in the feeder 130 which is rotating in a counter clockwise direction 141. The cassette 126 is pushed into the slot 125 and further causing the rack gear 128 on the cassette 126 to react with the pinion gear 129 that is suitably fastened to the feeder 130, thus causing the feeder to rotate in a counter clockwise direction 141 and feed corn kernels 133 into the corn kernel chambers 137. The cogs 138 in the feeder 130 separate the corn kernels 133 from each other and further drop the corn kernels 133 into the corn kernel chambers 137 of the cassette in a precise manner.

Referring to FIG. 66, there is shown a plan view of the cassette 126.

The cassette 126 is composed of the corn kernel chambers 137 that hold the corn kernels: On one side, is the rack gear 128. On another side there is shown the thumb grip 139 for gripping the cassette 126 and pushing it in or out of the feeder.

Referring to FIG. 67, there is shown another section elevation of the corn kernel feeder 122.

The corn kernels 133 are held in the jar 127 and fall into the mouth 135 and are guided by the corn kernel guides 132 into the throat 136, where they are caught by the cogs 138 of the feeder 130. The feeder 130 is turned by the movement of the cassette 126 through the slot 125 which causes the rack gear 128 to turn the pinion gear 129 which further turns the feeder 130 which causes the corn kernels 133 to be moved by the cogs 138 and fall into the corn kernel chambers 137 of the cassette 126.

Although the systems described in detail supra has been found to be most satisfactory and preferred, many variations in mechanics, structure and method are possible. For example, heating elements could be used instead of microwaves as a source of heating; plastics could be used instead of paper and various other configurations could be used to hold corn kernels.

The above are exemplary of the possible changes or variations because many varying and different embodiments made within the scope of the inventive concept herein taught and because many modifications may be made in the embodiments herein detailed in accordance with the descriptive requirements of law, it should be understood that the details herein are to be interpreted as illustrative and not in a limiting sense.

What is claimed as invention is:

1. A popcorn sheet for containing and holding popcorn kernels close to the microwave source in a microwave oven, for the purpose of popping said popcorn kernels into popped corn and further holding said popped corn in a container further away from said microwave source to reduce the potential of burning said popped corn, and further preventing any unpopped popcorn kernels from mixing with said popped corn, comprising;

at least one popcorn kernel chamber, comprised of chamber walls, said chamber walls are fixed to said popcorn sheet;
   a burst panel, said burst panel fixed to said chamber walls and further forming compartments to isolate and contain at least one popcorn kernel, said popcorn kernel to be heated by microwaves until said popcorn kernel pops into said popped corn and bursts through said burst panel and falls into said container, said unpopped popcorn kernel that does not pop when exposed to said microwaves remains in said popcorn kernel chamber.

2. The popcorn sheet of claim 1 wherein said popcorn sheet is folded for packaging.

3. The popcorn kernel chambers of claim 1 wherein said chambers contain flavoring with said popcorn kernels.

4. The popcorn sheet of claim 1 wherein said popcorn sheet is supported on said container by support panels.

5. The popcorn sheet of claim 1 wherein said popcorn sheet has a reflective material covering areas not over said popcorn kernel chambers, said reflective material to reflect microwaves and will further prevent microwaves from reaching and burning said popped corn.

6. A popcorn panel for containing and holding popcorn kernels in combination with an expansible unopened popcorn container suitable for containing popped corn during popping, said popcorn panel for containing and holding popcorn kernels closer to the microwave source in a microwave oven for the purposes of popping said popcorn kernels into popped corn in an expansible container and further holding said popped corn in said expansible container further away from said microwave source to reduce the potential of burning said popped corn and to further prevent any unpopped popcorn kernels from mixing with said popped corn, comprising popcorn kernel chambers, comprised of chamber walls fixed to said popcorn panel;

a burst panel, said burst panel fixed to said chamber walls and further forming compartments to isolate and contain single popcorn kernels, said single popcorn kernels to be heated by said microwaves until said popcorn kernels pop into popped corn and burst through said burst panel and fall into said expansible popcorn container, said unpopped popcorn kernels that do not pop when exposed to said microwaves remain in said popcorn kernel chambers.

7. The expansible unopened popcorn container of claim 6 wherein said expansible container is fixed to said popcorn panel with removable tape.

8. The expansible unopened popcorn container of claim 6 wherein said expansible unopened popcorn container is cone shaped when expanded.

9. The expansible unopened popcorn container of claim 6 comprising a cone shaped cylinder with a round upper end and a round lower end; said round upper end having a greater diameter than said round lower end; said round upper end having a said popcorn panel of a similar diameter as said upper end and said popcorn panel further is fixed to said upper end with tape, and further comprising;

a stand, said stand being fixed to said lower end of said expansible unopened popcorn container, and said stand having a greater diameter than said lower end, for balancing said expansible unopened popcorn container while said popcorn kernels are being popped into popcorn.

10. The expansible unopened popcorn container of claim 6 wherein said unopened popcorn container is a triangle in section; said triangle having three legs comprising;

at least one said popcorn panel, on at least one sideleg of said expansible unopened popcorn container;

a base leg, said base leg to be set at the bottom of said unopened popcorn container.

11. A popcorn cassette for containing and holding popcorn kernels close to a heat source for the purpose of heating and popping said popcorn kernels into popped corn and further removing said popped corn away from said heat source to eliminate any potential of burning said popped corn, and further preventing any unpopped popcorn kernels from mixing with said popped corn comprising;

a cover panel, said cover panel having a thin depth in section with a suitable length and width to contain a sufficient number of said popcorn kernels in a single plane;

chamber walls with an inside end and an outside end wherein said chamber walls are perpendicular to said cover panel and are greater in height than a said popcorn kernel; said chamber walls are fixed at said inside end to said cover panel and said chamber walls essentially extends across said width of said cover panels and said chamber walls extends almost the entire said length of said cover panel;

at least one popcorn kernel chamber, said popcorn kernel chamber is formed by said chamber walls intersecting each other at an angle, said popcorn kernel chamber with an inside length and width to hold at least one said popcorn kernel;

a burst panel, said burst panel covering said popcorn kernel chamber, said burst panel is fixed to said outside ends of said chamber walls forming an enclosure that contains at least one said popcorn kernel, said burst panel to hold said popcorn kernel in said popcorn kernel chamber when said popcorn cassette is being transported, said burst panel to be sufficiently brittle to tear or break down when said popcorn kernel is sufficiently heated and bursts into said popped corn thus bursting through said burst panel and further falling out of said popcorn chambers.

12. The burst panel of claim 11 wherein said burst panel is constructed out of a non-flammable material.

13. The chamber walls of claim 11 wherein said chamber walls slope.

14. The popcorn cassette of claim 11 wherein said popcorn cassette has a finger grip fixed on one end.

15. The popcorn kernel chamber of claim 11 wherein said popcorn kernel chamber contained flavoring with said popcorn kernels.

16. A popcorn cassette for containing and holding popcorn kernels close to a heat source for the purpose of heating and popping said popcorn kernels into popped corn and further removing said popped corn away from said heat source to eliminate any potential of burning said popped corn, and further preventing any unpopped popcorn kernels from mixing with said popped corn comprising;

a lower panel, said lower panel having a thin depth in section with a suitable length and width to contain at least five of said popcorn kernels in a single plane;

chamber walls with an inside and an outside and wherein said chamber walls are perpendicular to said lower panel and further are equal or less in height then the width of a said popcorn kernel, said chamber walls are fixed at said inside end to said lower panel and said chamber walls essentially extend across said width of said lower panel, and said chamber walls further essentially extend the entire said length of said lower panel, said chamber walls are greater in width at the inside and are tapered to a lesser width at the outside end;

at least one popcorn kernel chamber, said popcorn kernel chamber is formed by said chamber walls intersecting each other at an angle, said popcorn kernel chamber with a sufficient inside length and width to hold at least one said popcorn kernel;

said popcorn kernel chamber to hold said popcorn kernel sufficiently near said heat source wherein said popcorn kernel will burst into popped corn and pop out of said popcorn kernel chamber with the aid of said tapered chamber walls.

17. The popcorn cassette of claim 16 wherein said popcorn cassette has a finger grip at one end.

18. The popcorn kernel chamber of claim 16 wherein said popcorn kernel chamber contains flavoring along with said popcorn kernel.

19. A popcorn sheet for holding popcorn kernels close to a heat source for the purpose of heating and popping said popcorn kernels into popped corn, and further removing said popped corn away from said heat source to eliminate any potential of burning said popped corn, and to further prevent any unpopped popcorn kernels from mixing with said popped corn comprising;

a panel, said panel having a thin depth in section with a suitable length and width to hold a suitable number of said popcorn kernels;

glue, said glue fixed to said panel and said glue further fixed to said popcorn kernels fixing said popcorn kernels to said panel, said glue to fix said popcorn kernels to said panel while said popcorn kernels are heated and further said glue releases said popcorn kernels from said panel when said popcorn kernels burst into said popped corn.

20. The panel of claim 19 wherein said panel is combined with an expansible bag.

21. The panel of claim 19 wherein said panel is placed over a container or bowl.

22. The panel of claim 21 wherein said panel is supported over a container with support panels.

23. The panel of claim 19 wherein said panel is fixed to a flavor chamber, wherein said flavor chamber contains flavoring and wherein said flavoring passes out of said flavor chamber through holes in flavor chamber and said flavoring falls on said popped corn in said container.

24. The popcorn sheet of claim 19 wherein said popcorn sheet has rectangular corrugations and wherein said rectangular corrugations allow said popcorn sheet to hold more said popcorn kernels and said rectangular corrugations further absorb the energy of said popcorn kernels as said popcorn kernels explode or pop.

25. The popcorn sheet of claim 19 wherein said popcorn sheet has triangular corrugations and wherein said triangular corrugations allow said popcorn sheet to hold more said popcorn kernels and said triangular corrugations further absorb the energy of said popcorn kernels as said popcorn kernels explode or pop.

26. A corn kernel block, for holding popcorn kernels while said popcorn kernels are being heated and further popping said popcorn kernels when said popcorn kernels have been sufficiently heated and allowing said popped corn to fall from said corn kernel block to a location further removed from the heat source, comprising;

a block, said block having a depth at least equal to the length of a said popcorn kernel and said block to have a length and width to hold a suitable number of corn kernels, said corn kernels to be inserted into said block and held in said block until said corn kernels are sufficiently heated and further pops into said popped corn and bursts out of said block.

27. The block of claim 26 wherein said corn kernels are inserted into said block with flavoring.

28. The block of claim 26 wherein said block is suspended from a container cover by a suspension means, comprising;

a pin, said pin inserted into said block;

a suspension means, said suspension mean rotatably fixed to said pin wherein said pin rotates clockwise or counter-clockwise relative to said suspension means;

tape, said tape fixed to said suspension means wherein said tape is also fixed to said container cover.

29. The chamber walls of claim 11 wherein said chamber walls are corrugations.

30. The corn kernel block of claim 26 wherein said corn kernel block is made of a foam material.

31. Said corn kernel block of claim 27 wherein said corn kernel block is any material suitable to hold said popcorn kernels.

* * * * *